Nov. 21, 1961 E. L. WHIPPLE 3,009,573
ELECTROSTATIC SEPARATION OF MINERALS
Filed Aug. 2, 1955 19 Sheets-Sheet 6

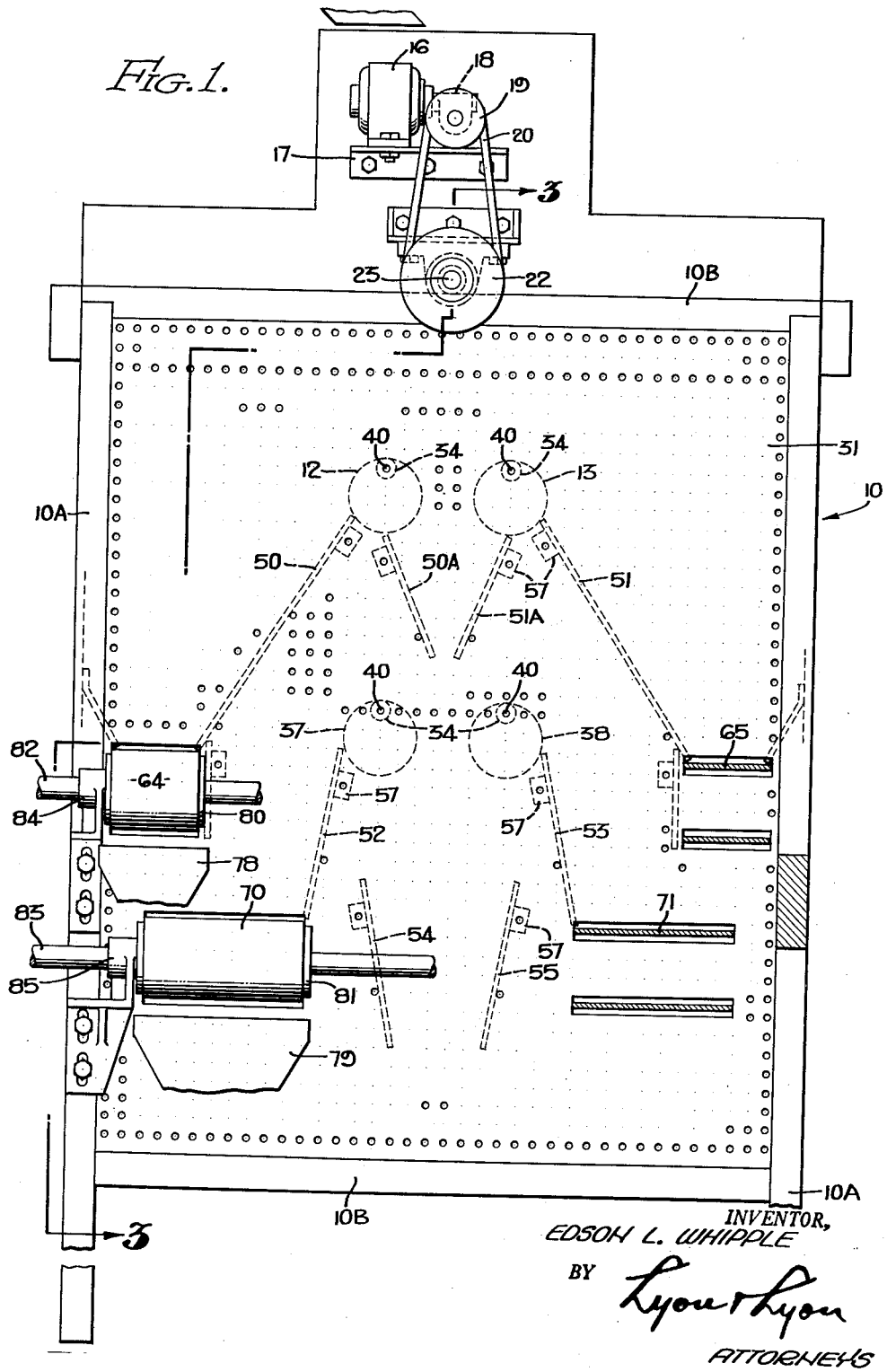

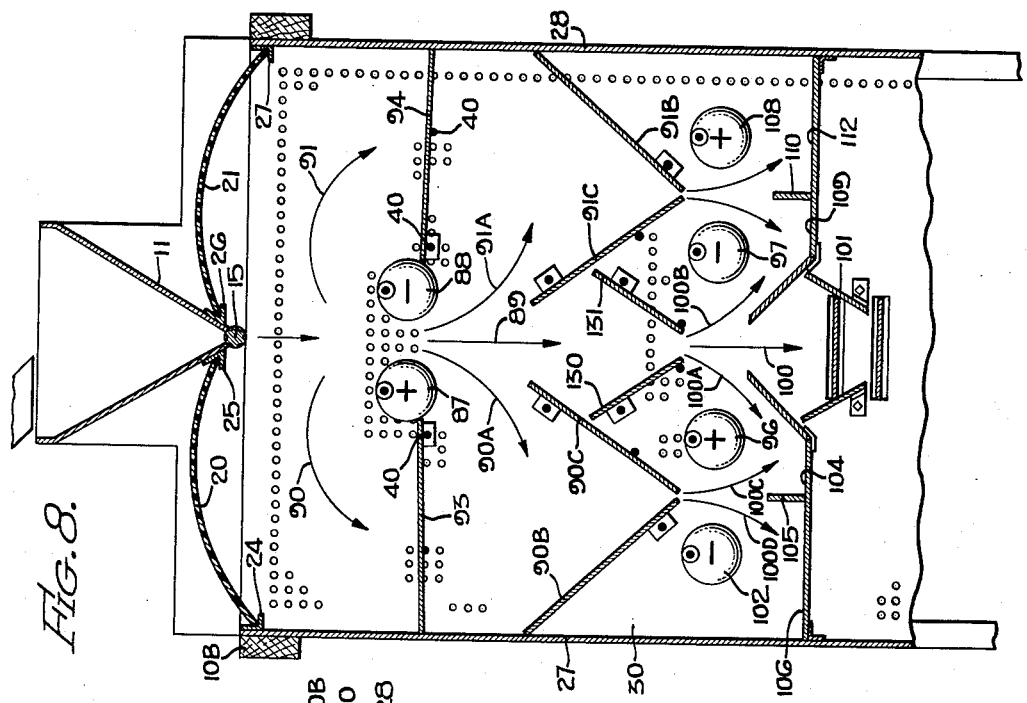

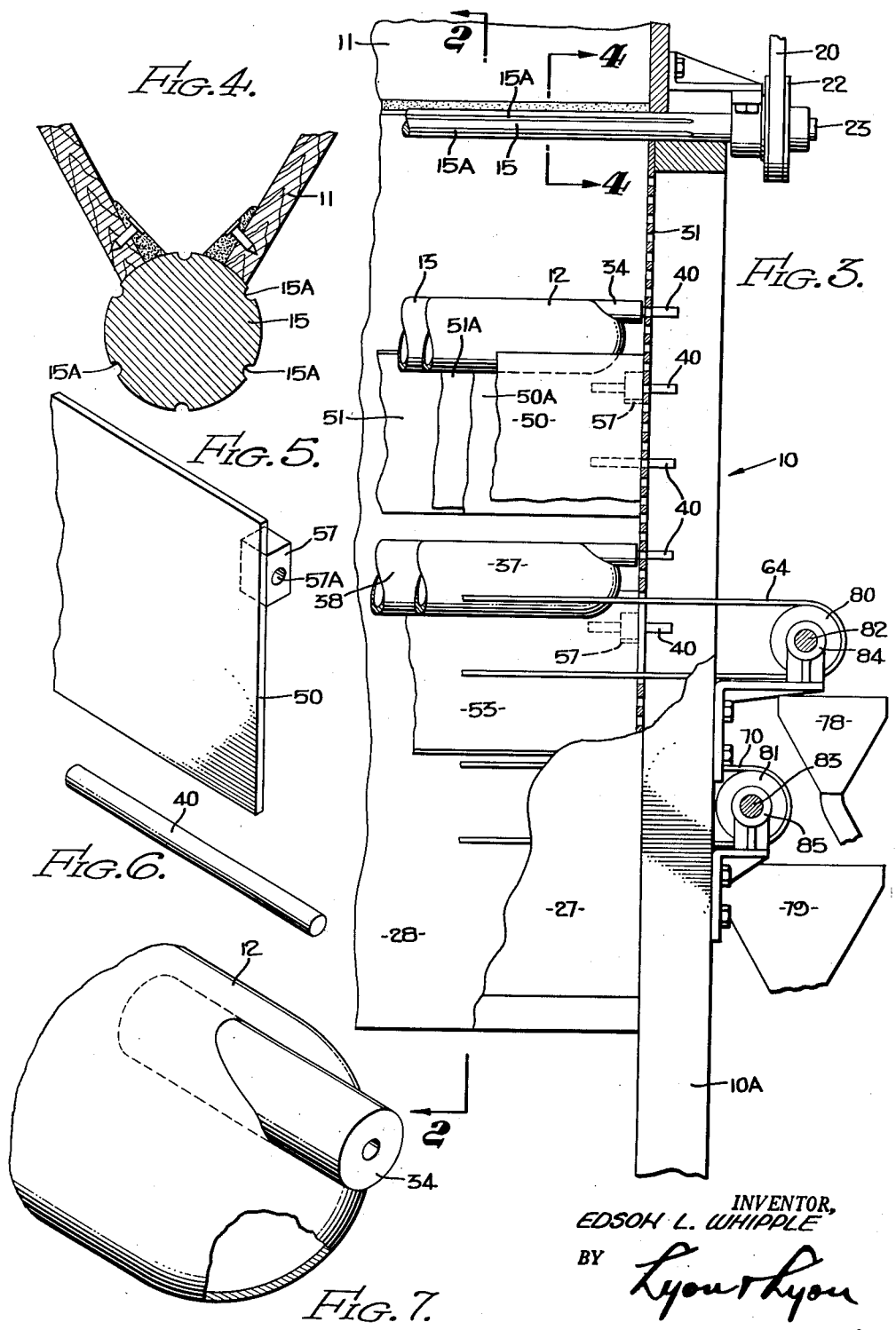

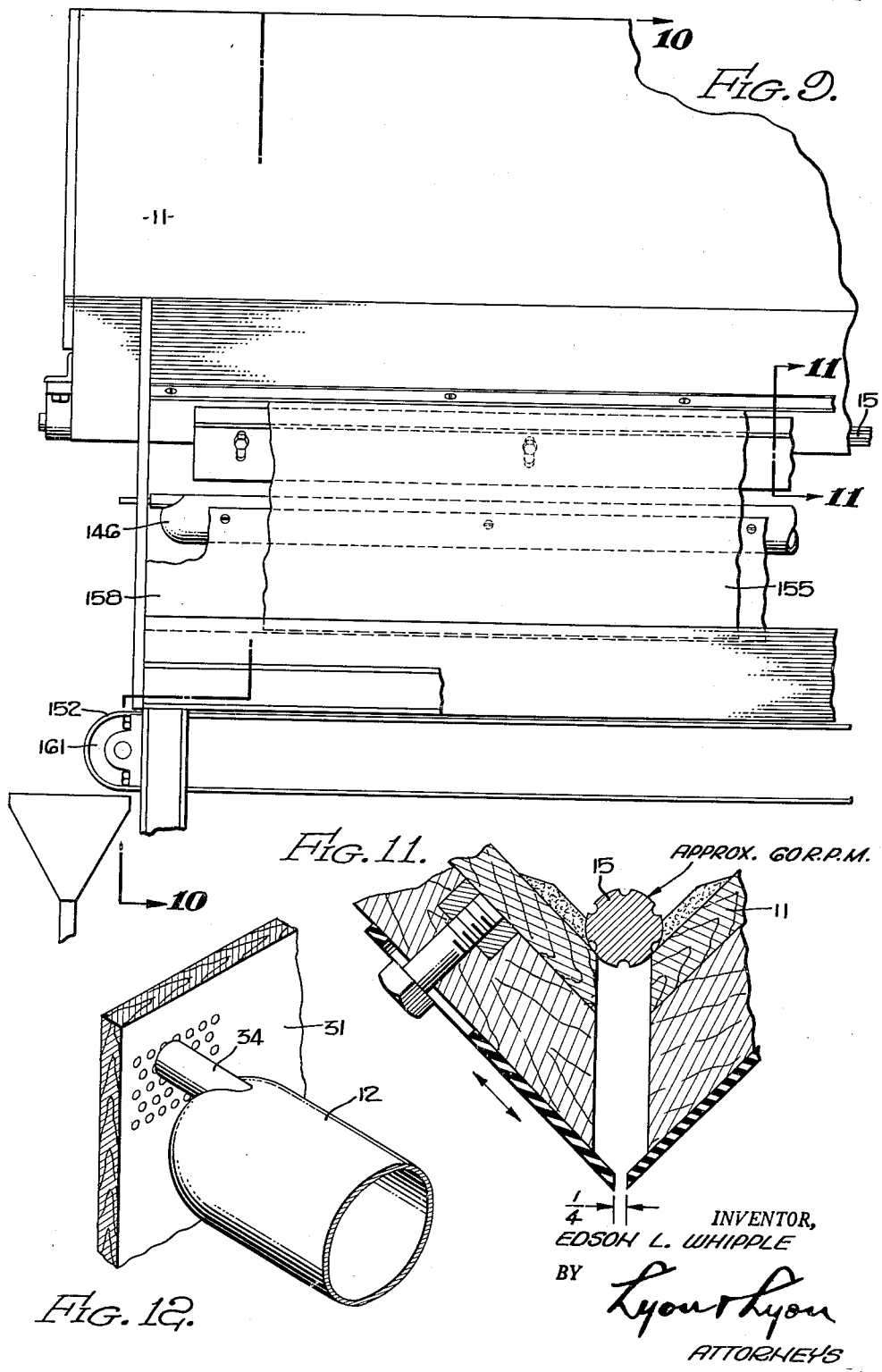

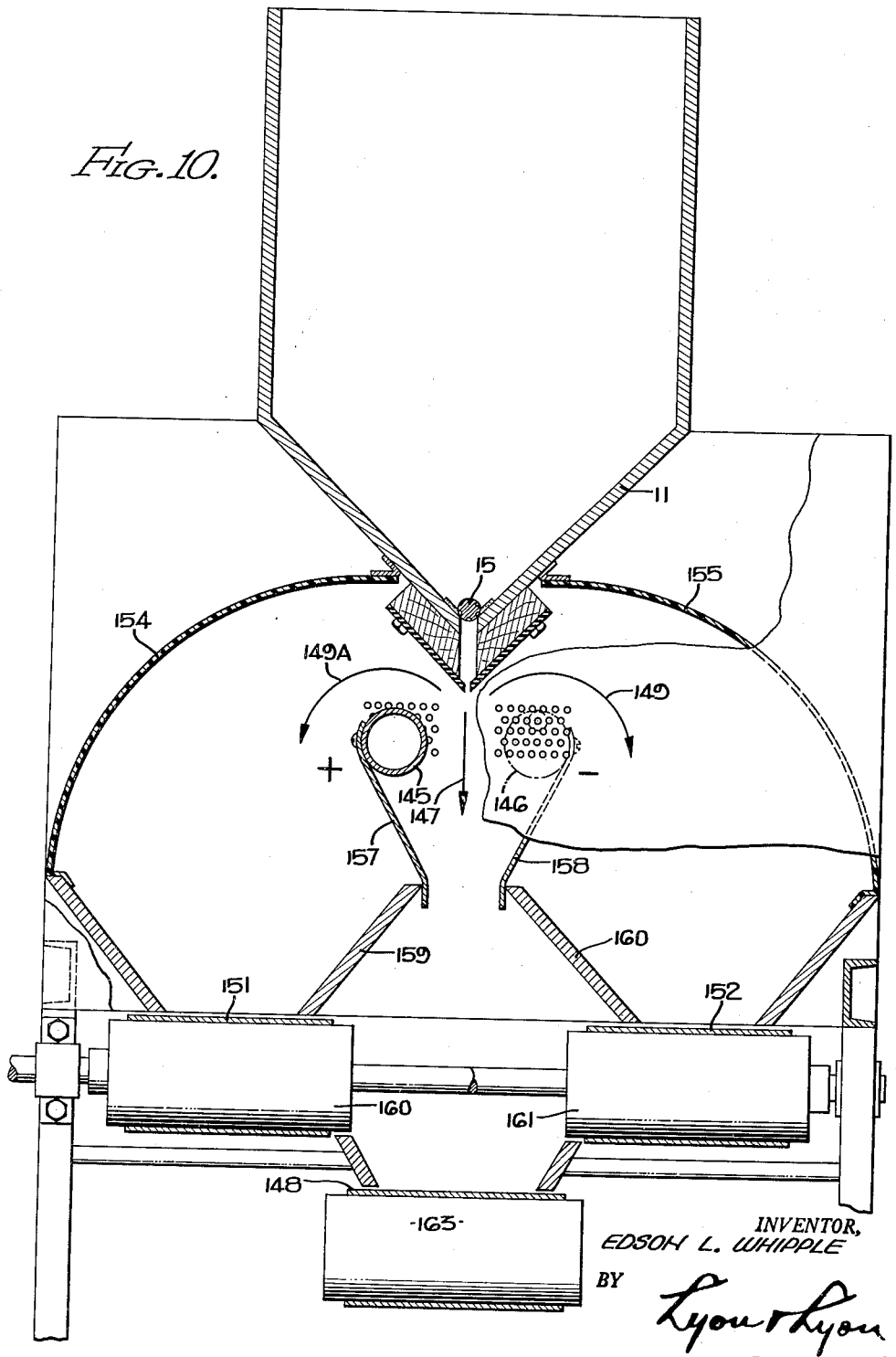

INVENTOR,
EDSON L. WHIPPLE
BY
Lyon & Lyon
ATTORNEYS

Nov. 21, 1961     E. L. WHIPPLE     3,009,573
ELECTROSTATIC SEPARATION OF MINERALS
Filed Aug. 2, 1955     19 Sheets-Sheet 7
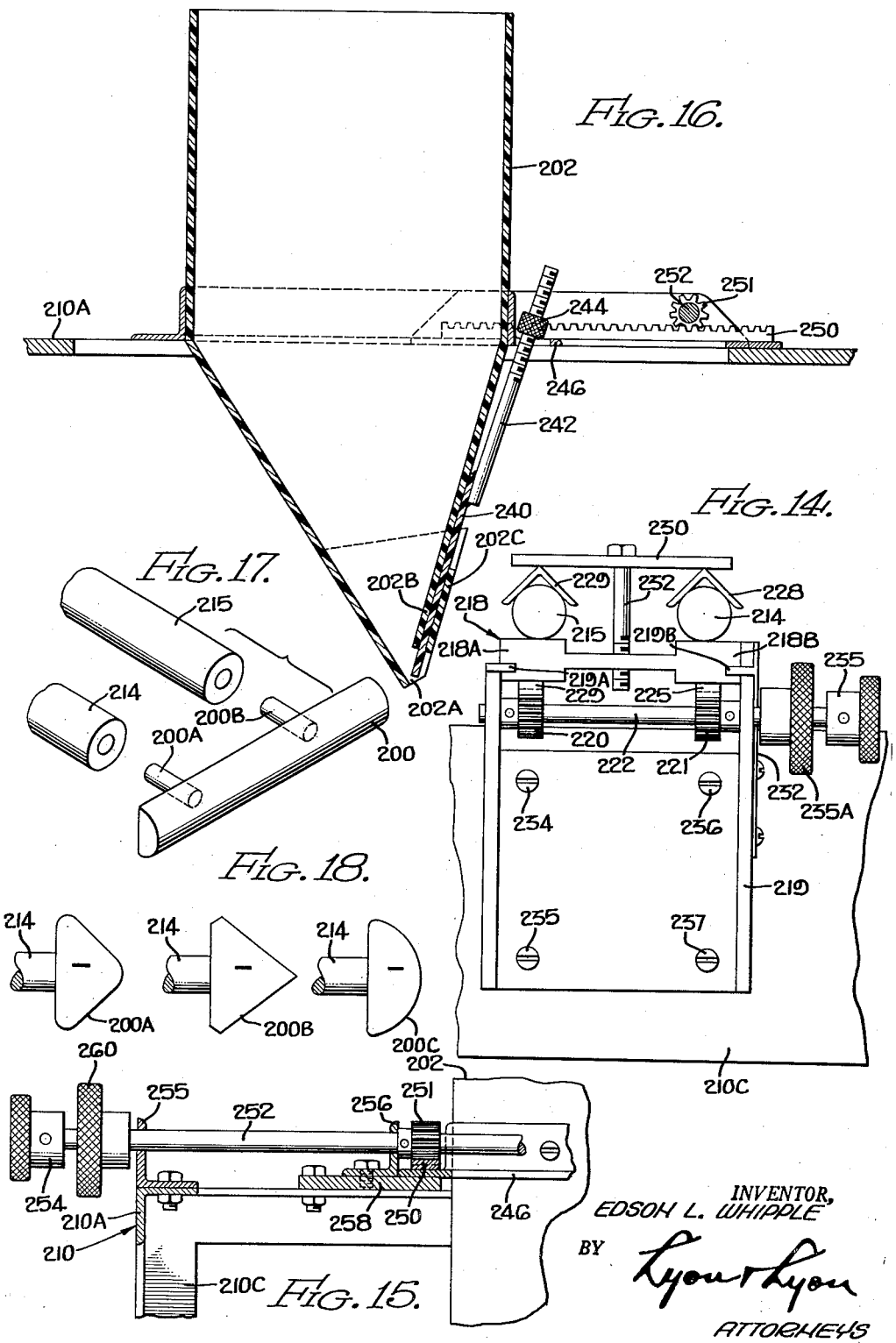

Nov. 21, 1961  E. L. WHIPPLE  3,009,573
ELECTROSTATIC SEPARATION OF MINERALS
Filed Aug. 2, 1955  19 Sheets-Sheet 8
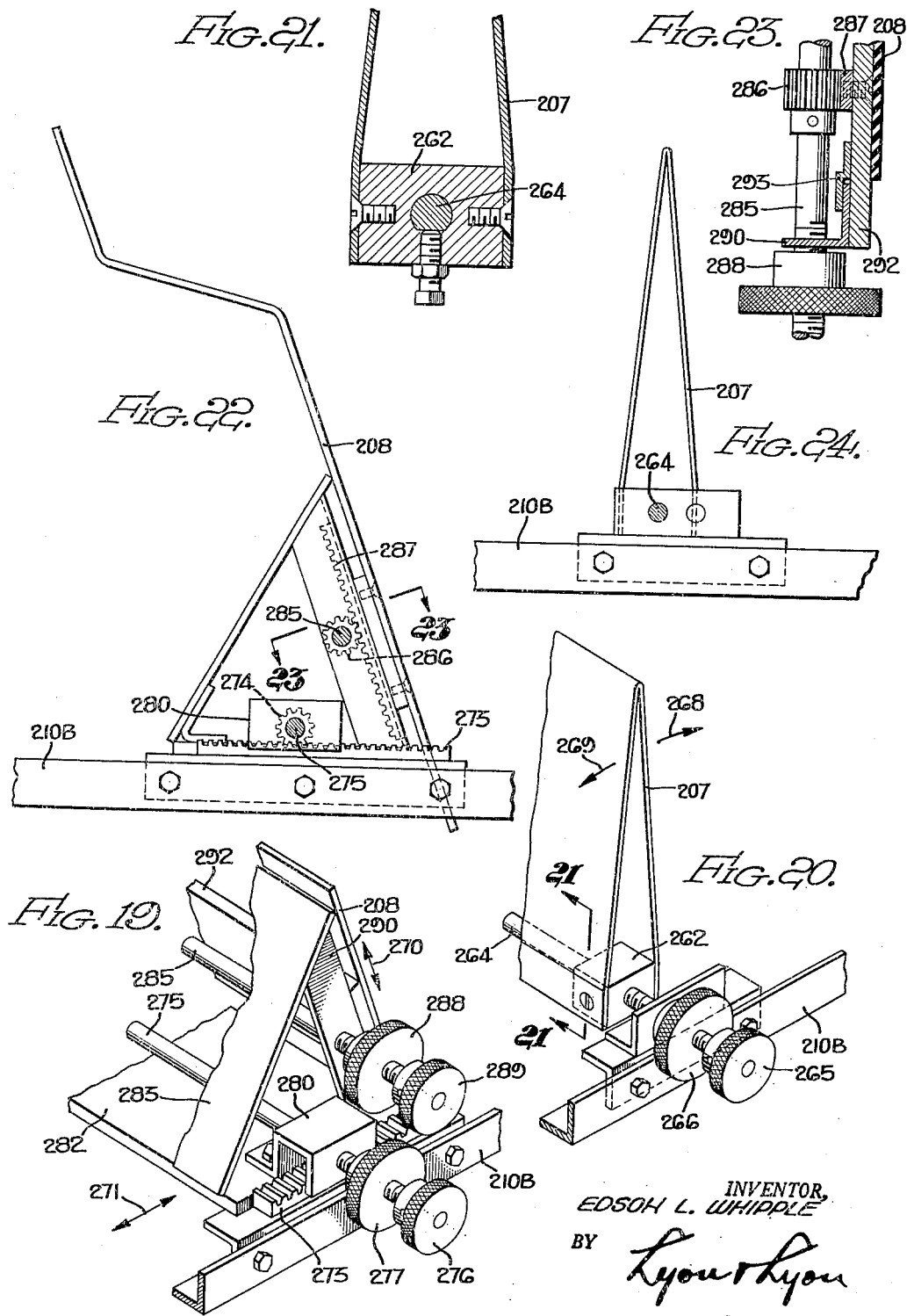
INVENTOR,
EDSON L. WHIPPLE
BY Lyon & Lyon
ATTORNEYS

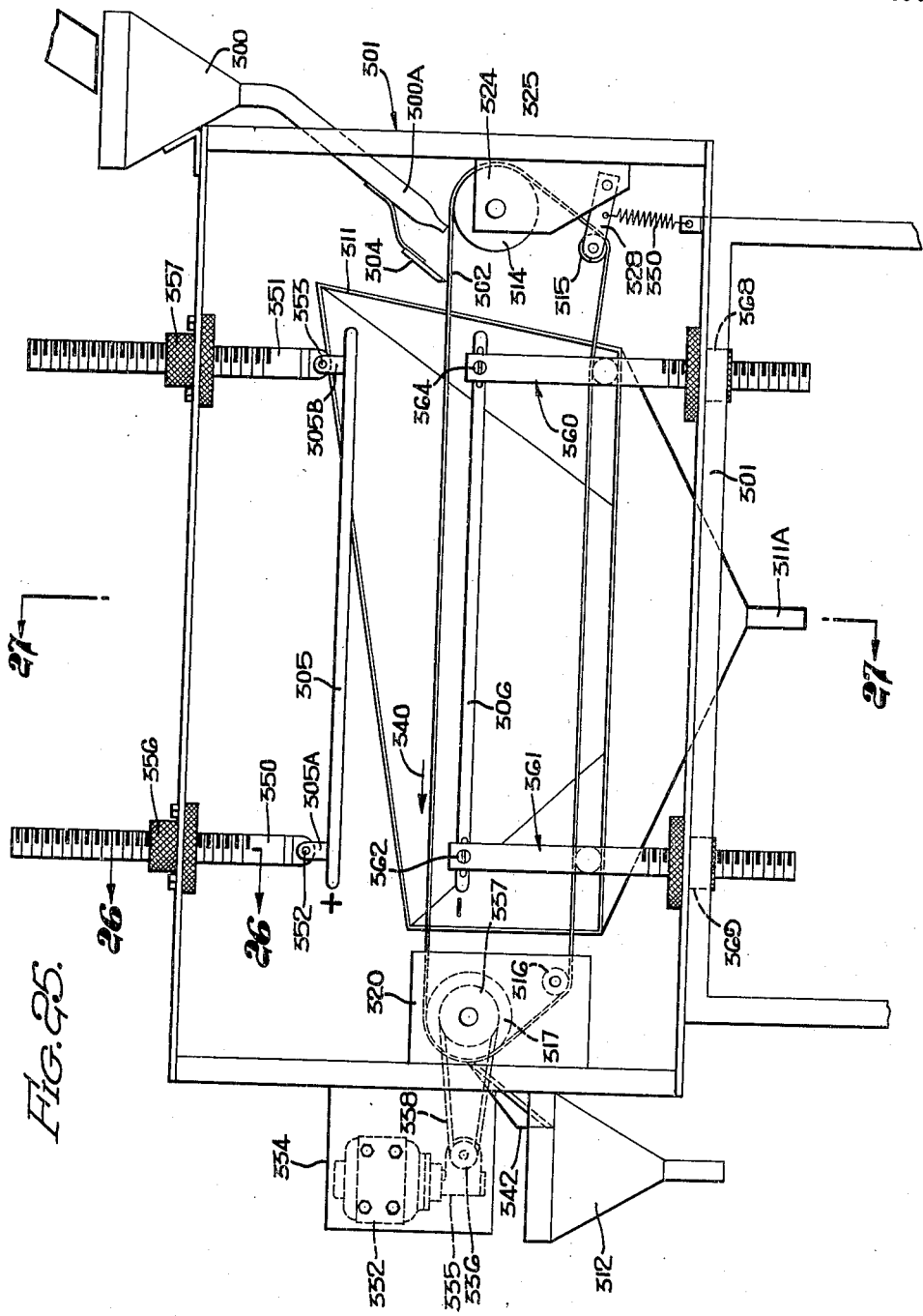

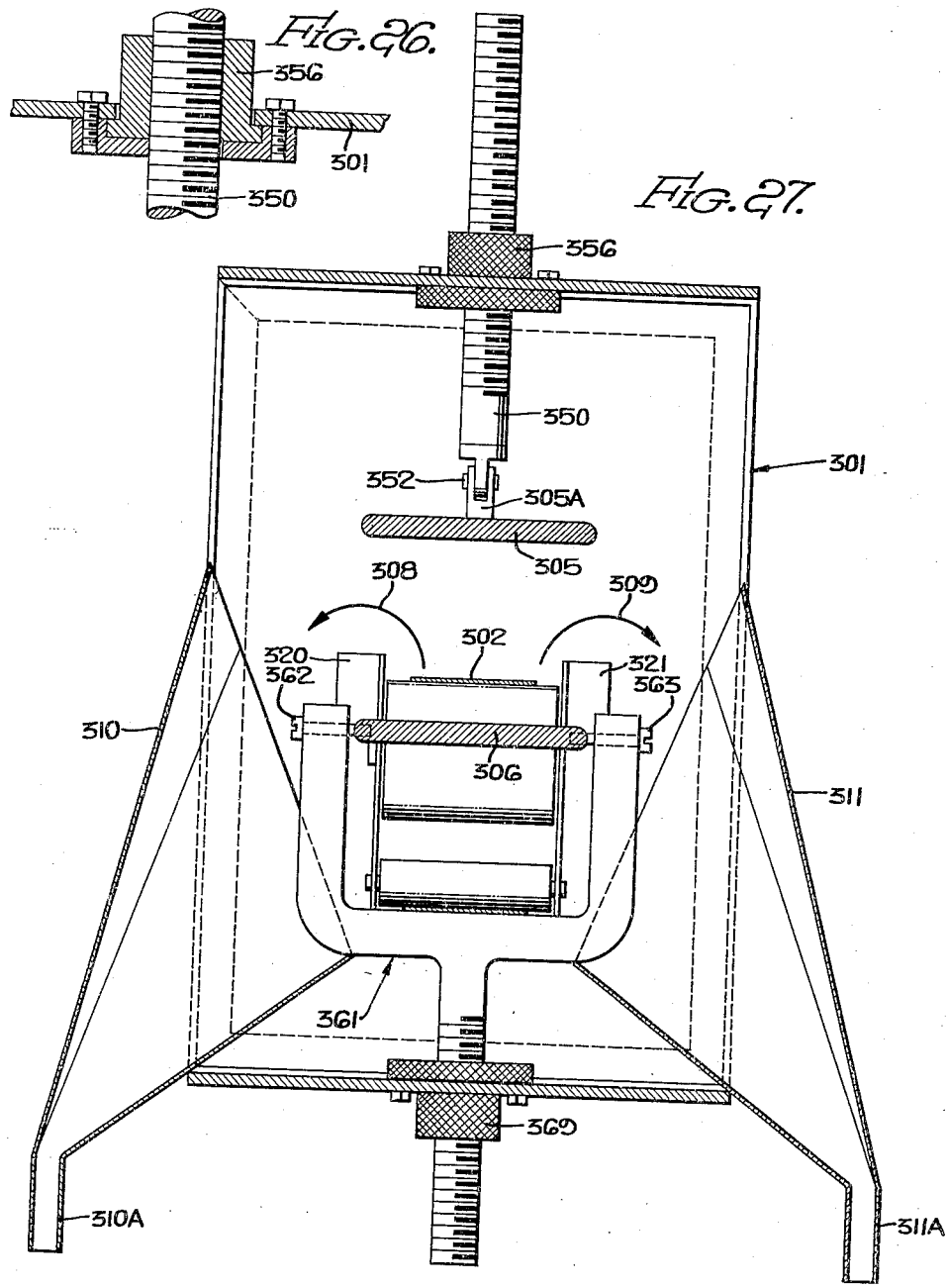

Nov. 21, 1961   E. L. WHIPPLE   3,009,573
ELECTROSTATIC SEPARATION OF MINERALS
Filed Aug. 2, 1955   19 Sheets-Sheet 11

INVENTOR,
EDSON L. WHIPPLE
BY Lyon&Lyon
ATTORNEYS

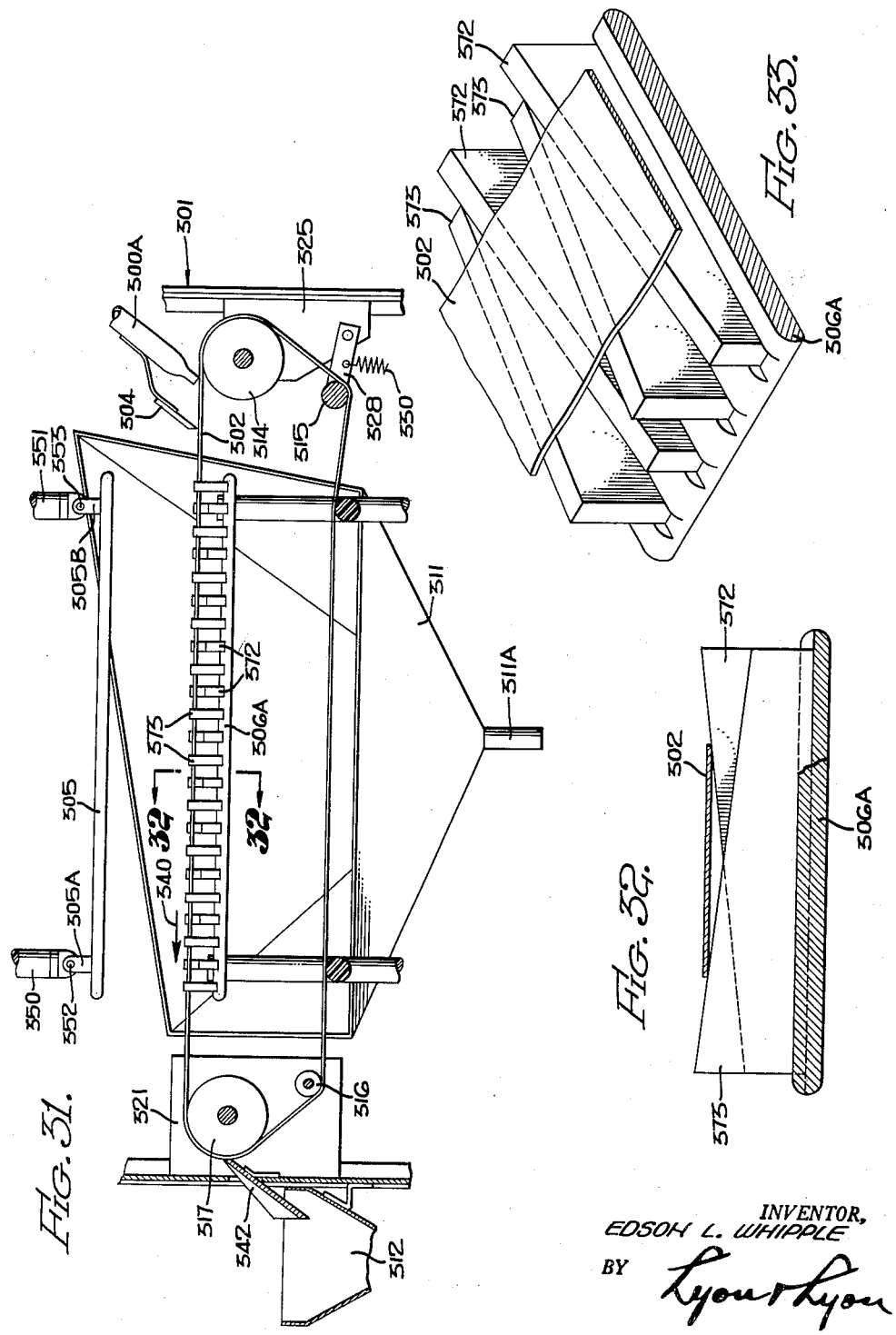

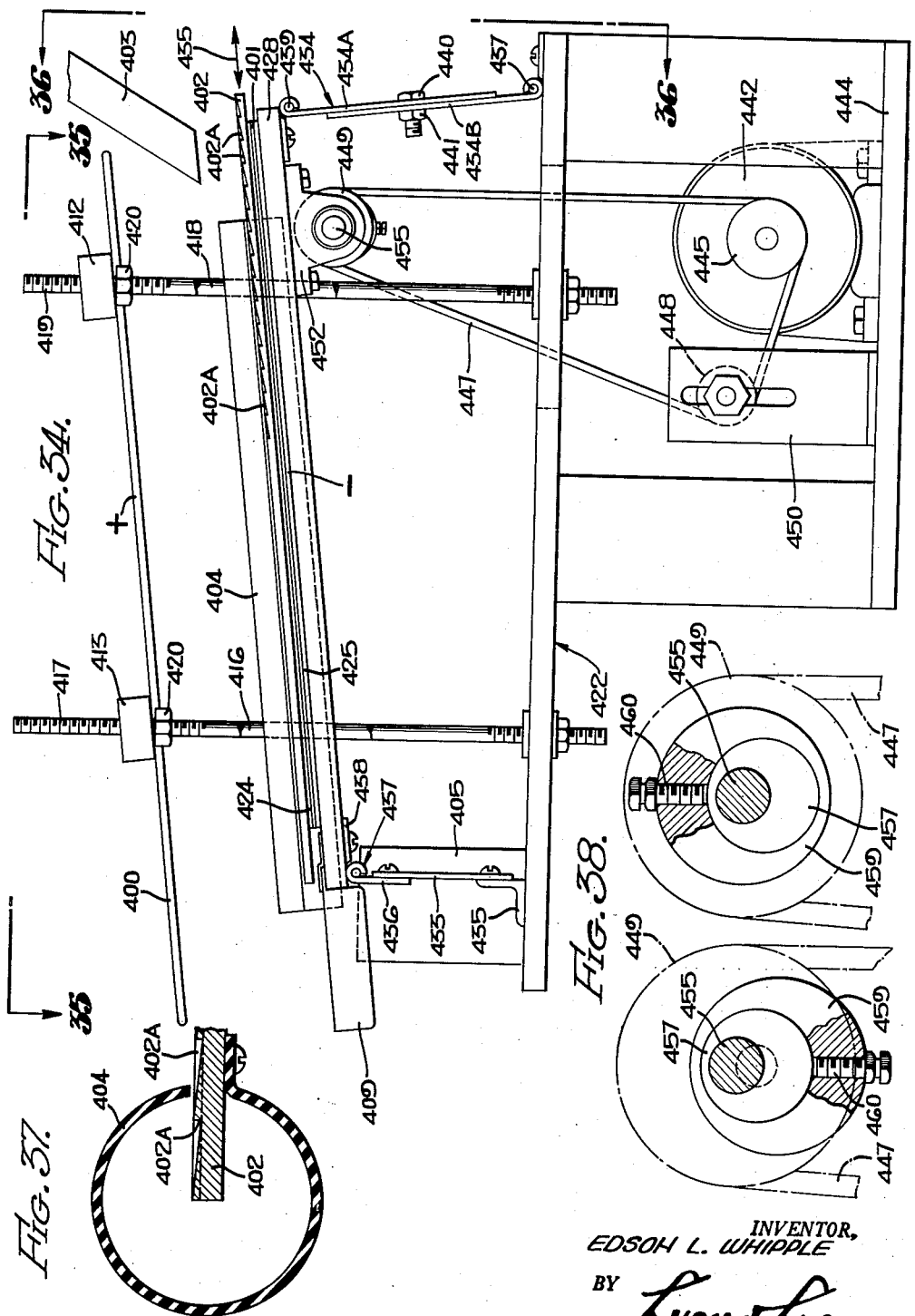

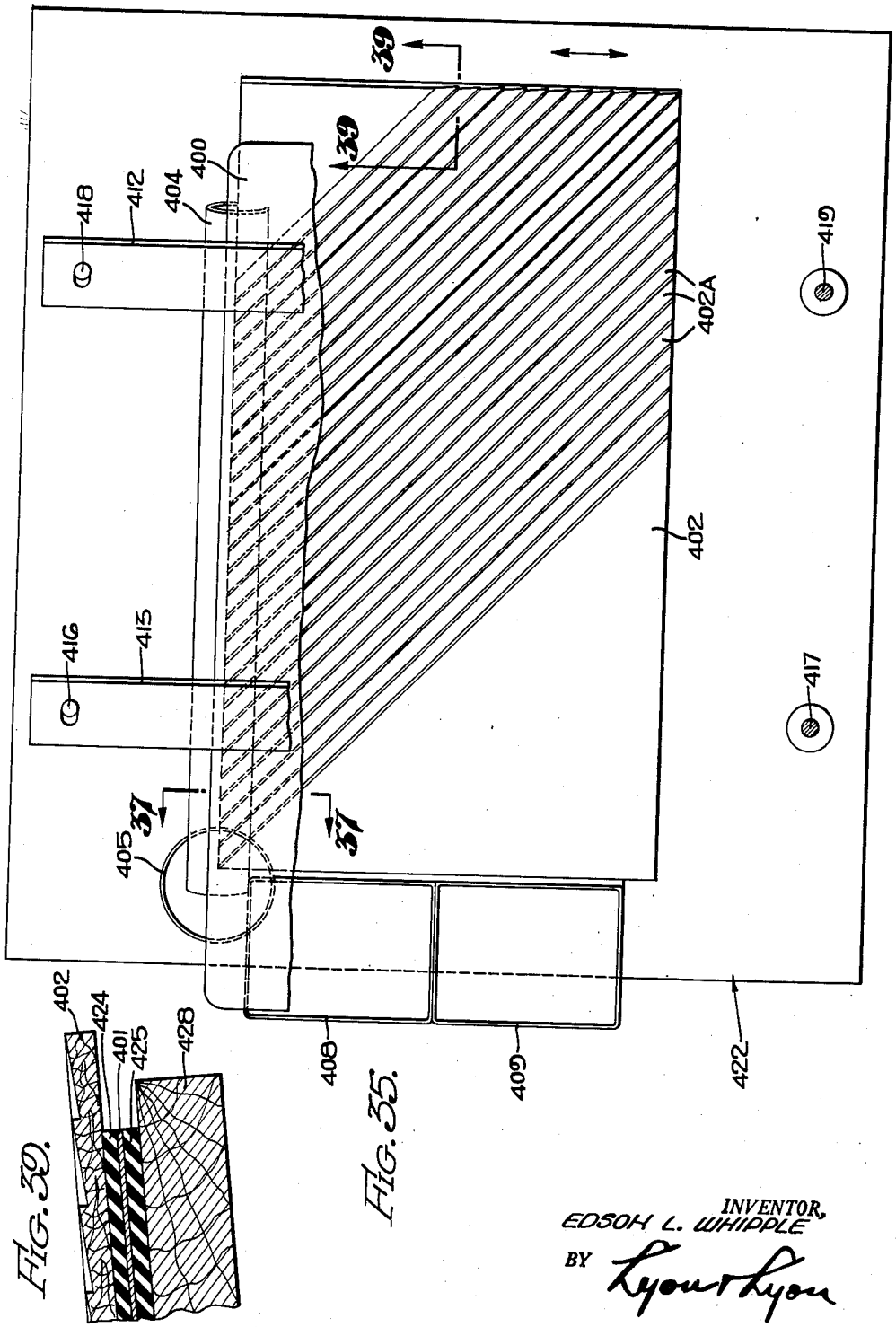

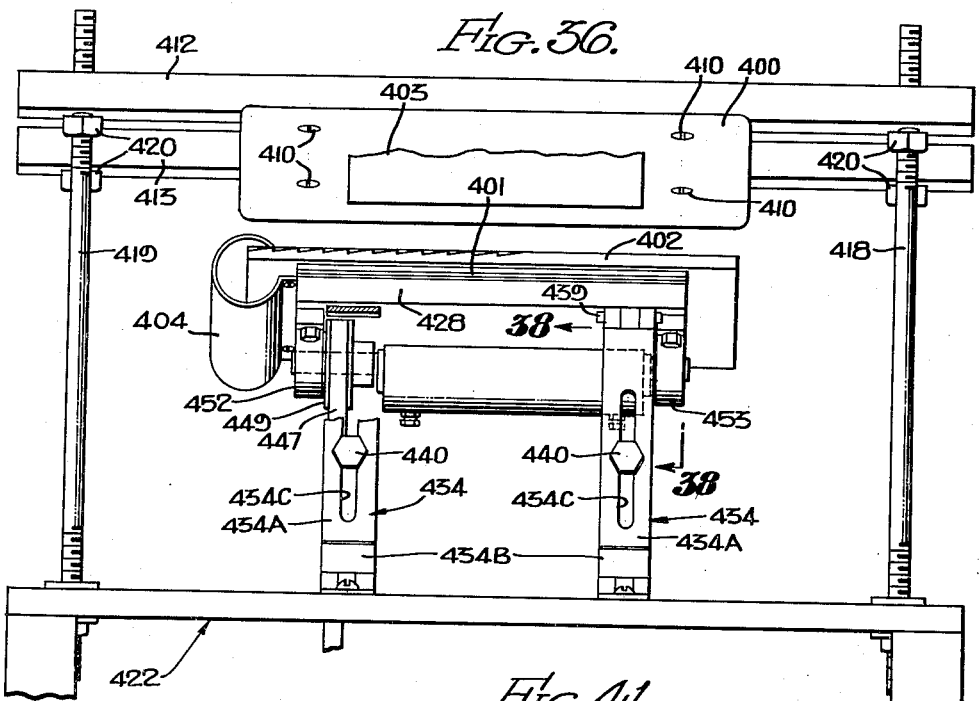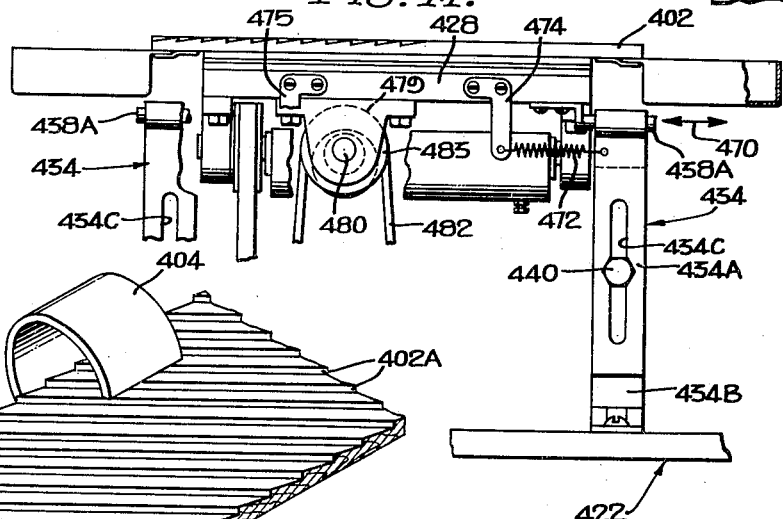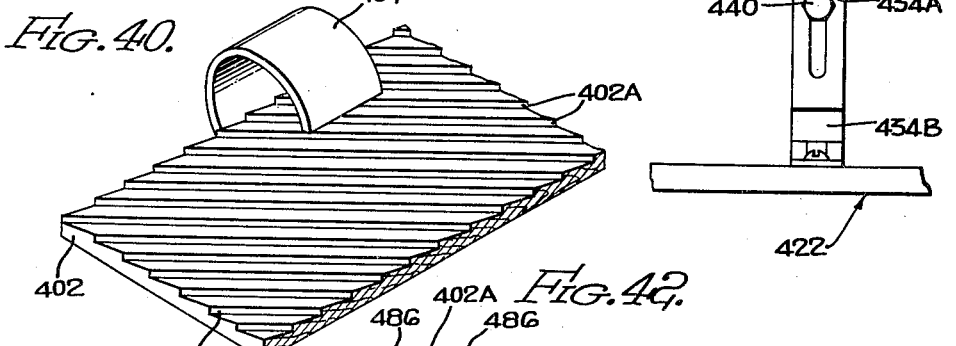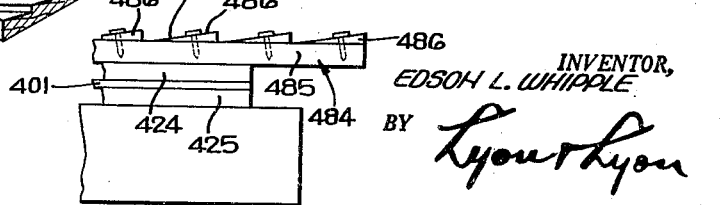

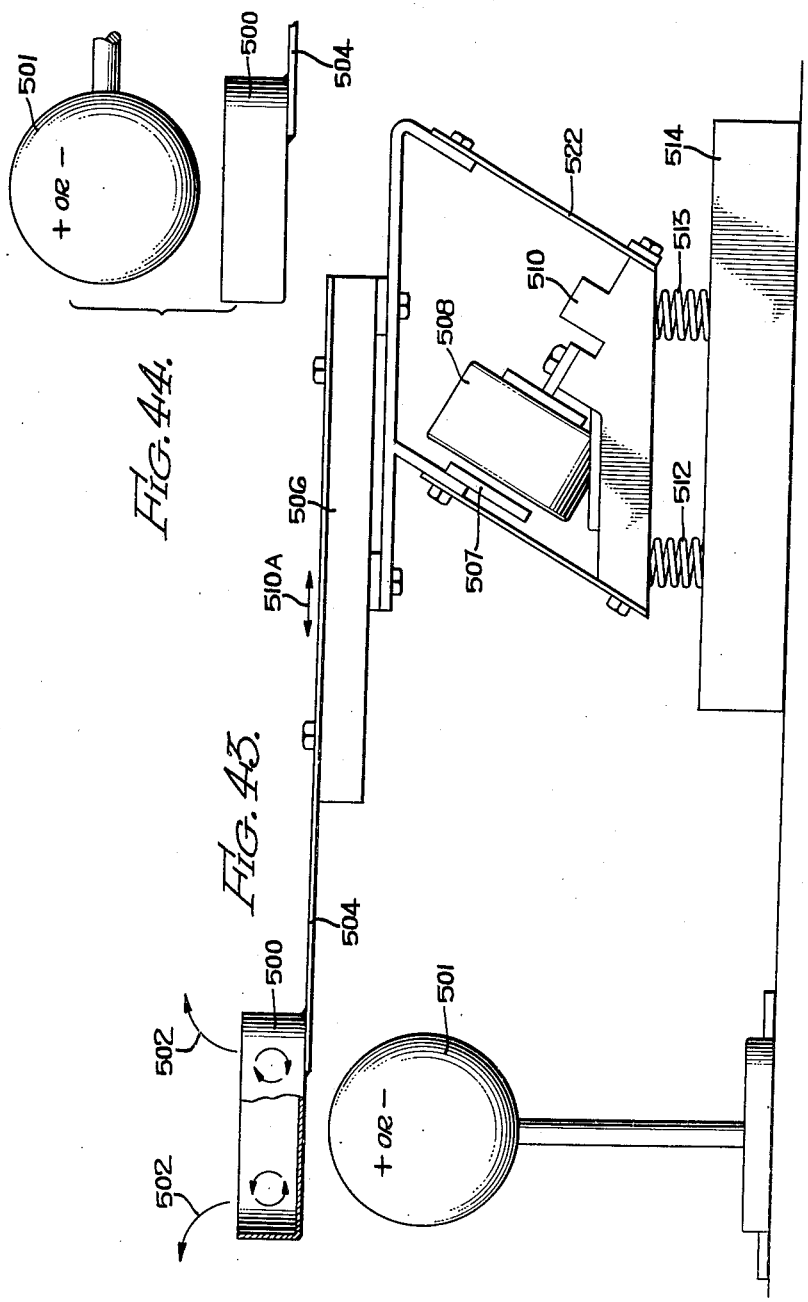

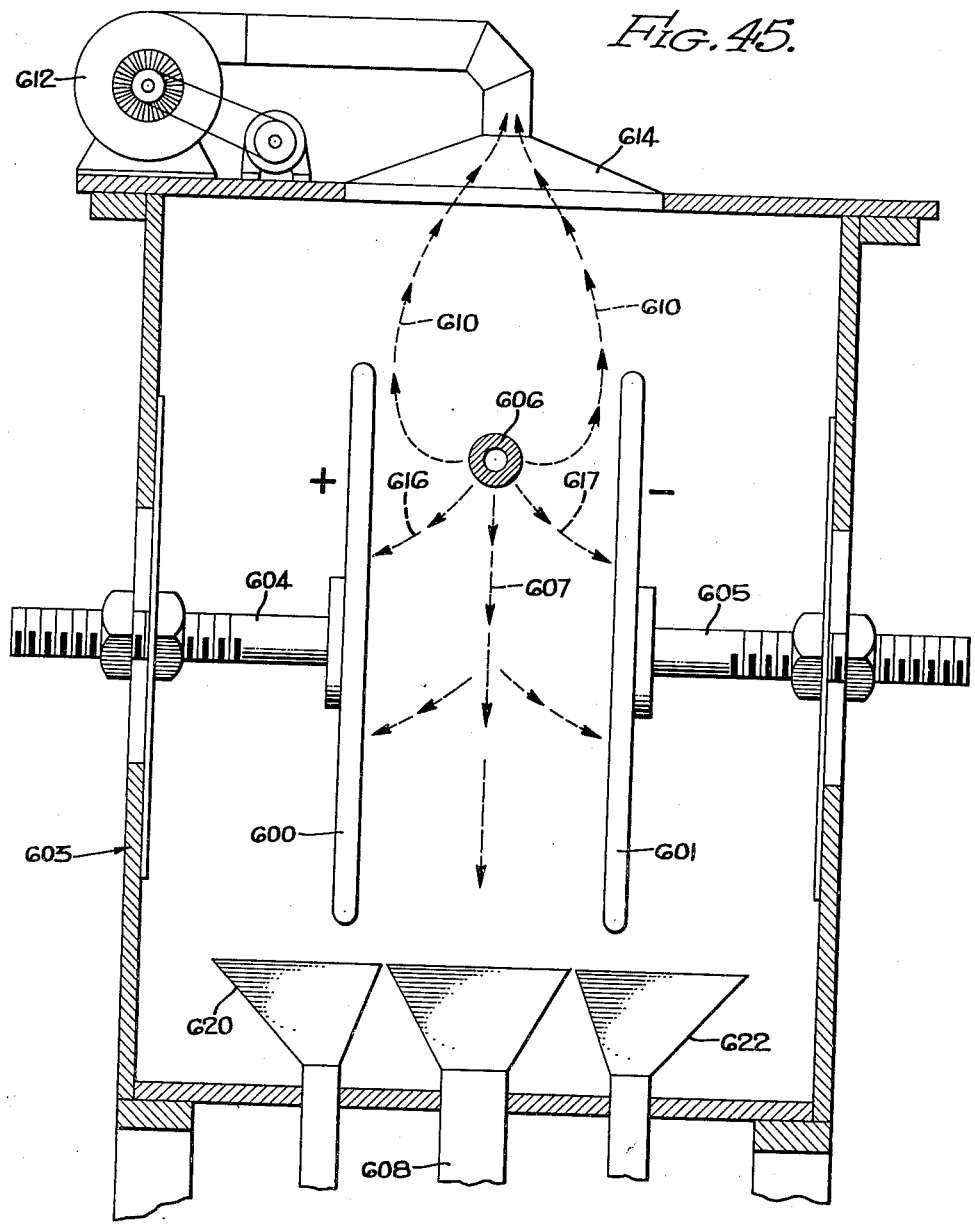

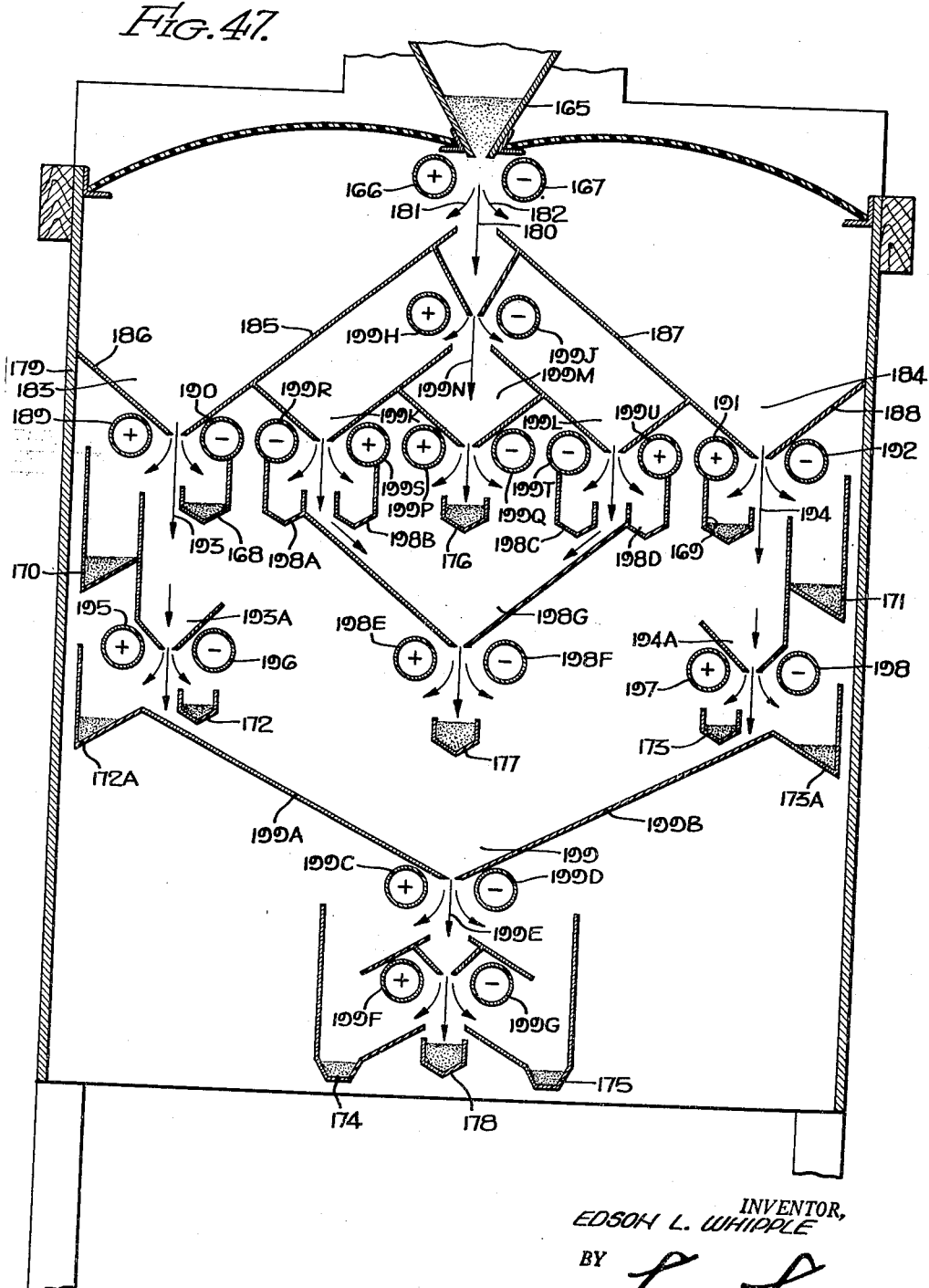

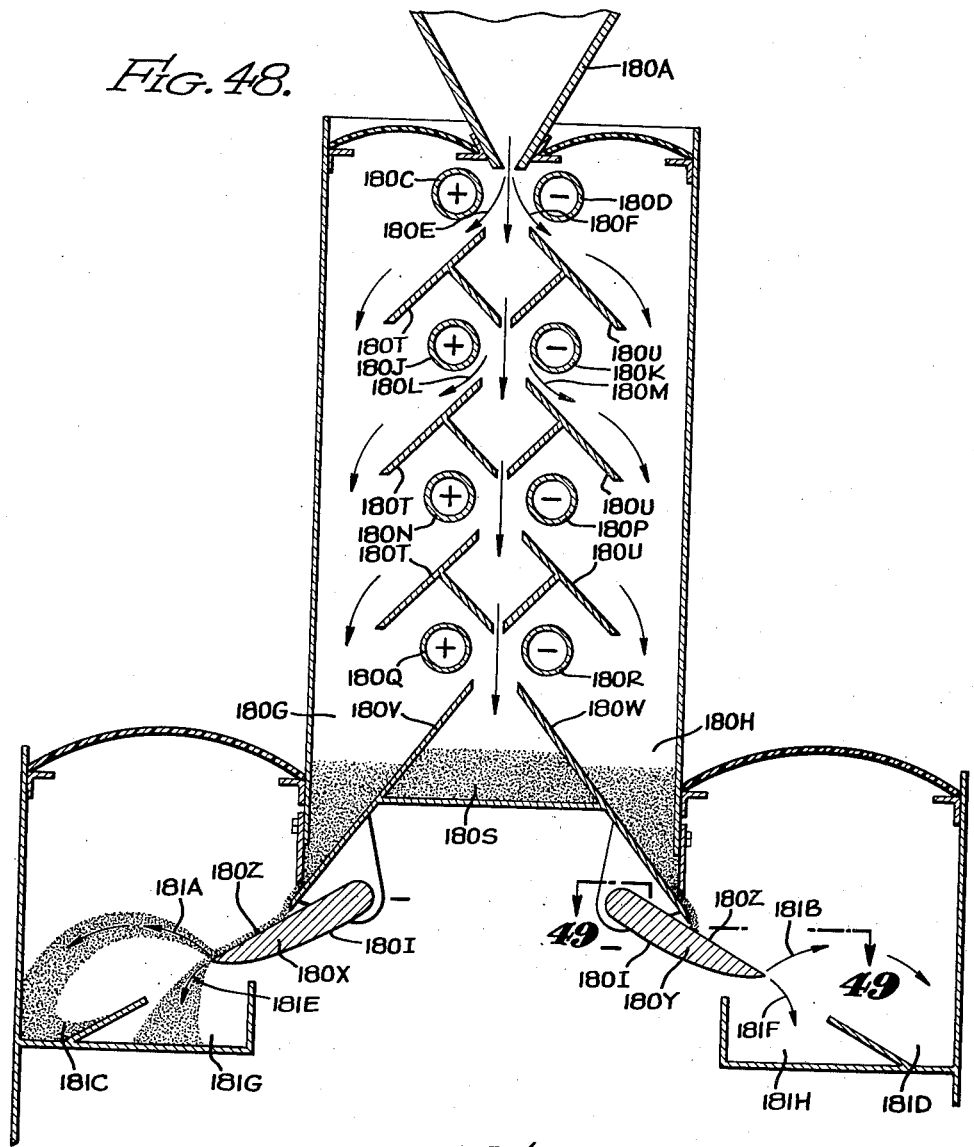
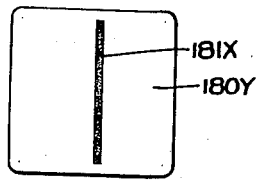
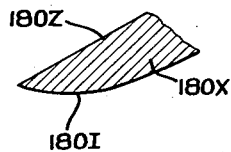

United States Patent Office 3,009,573
Patented Nov. 21, 1961

3,009,573
ELECTROSTATIC SEPARATION OF MINERALS
Edson L. Whipple, Phoenix, Ariz., assignor to Bowen-McLaughlin, Inc., Phoenix, Ariz., a corporation of Nevada
Filed Aug. 2, 1955, Ser. No. 526,039
5 Claims. (Cl. 209—130)

The present invention relates generally to improved means and techniques useful in the separation of one material or substance from another and is particularly useful in producing separation of a mineral, material, or substance, which is contained as a relatively small fraction in part of a mass, and, more particularly, is particularly useful in the separation of uranium minerals from ores containing such minerals in small proportion.

While the particular means and techniques described herein are particularly useful in the electrostatic separation of uranium minerals from uranium bearing ores, the present invention, in its broader aspect, is useful also in the electrostatic separation of other minerals from ores, as for example the hydrous silicates known for their magnesium, iron and aluminum content and commonly referred to as Culmagesite, Hallite, Kerrite, Maconite, Protovermiculite, Philadelphite, etc., which generally comprise the source of vermiculite. Another class of materials are the carbonaceous ores from which graphite is obtained. Another important class of materials are the strategic minerals which can be separated from the associated gangue by the means and techniques described.

This application constitutes a continuation-in-part of my co-pending application, Serial Number 395,713, filed December 2, 1953, which is a continuation-in-part of my application, Serial Number 96,220, filed May 31, 1949 (now abandoned); and such application Serial Number 395,713 is also a continuation-in-part of my application, Serial Number 312,804, filed October 2, 1952 (now abandoned). Said application Serial No. 395,713 has been allowed to become abandoned in favor of the present application.

As in my prior above-mentioned patent applications, the present application discloses novel means and techniques for producing levitation of a portion of comminuted material or ore by electrostatic means for effecting separation. Such levitation results from subjecting comminuted material or ores to an electrostatic field which has an intensity above a critical threshold intensity. The material or ore, in general, is allowed to gravitate into such field, but certain components, due to their interaction with the electrostatic field, have forces developed thereon that, in fact, overcome the gravity forces and cause the material particles to be raised, i.e. levitated, to a region where they may be conveniently collected apart from the remaining particles that gravitate through the field.

In producing separation by levitation, the apparatus described herein involves, generally, a pair of electrodes that are spaced in a horizontal direction so that ores may gravitate between the same without touching either electrode. The electrode spacings are, for example, in the order of three to four inches and voltages are applied to such electrodes in a range of 30,000 volts to 200,000 volts, depending upon the material which is to be separated. In carrying out the process, the ore is finely ground. Some of the ground ore is allowed to fall by gravity from a generally centrally disposed hopper outlet into the space between the electrodes. The particular power supply used has its center tap grounded so that one electrode is at a certain positive voltage above ground and the other negative electrode is at the same but at a negative potential with respect to ground. Different materials gravitate between the electrodes unless a certain critical threshold voltage is applied between the electrodes in an amount depending upon the particular material. When the voltage exceeds such critical value, all of the finely ground material will not gravitate through the electrodes, but a portion thereof is levitated above and around the electrodes to a position where it may be conveniently collected, while other materials in the mixture gravitate through the electrodes. The critical threshold potential depends on the material. Thus, for example, in the case of barium or strontium titanates, the critical voltage is the lowest; and with a four inch electrode spacing is 30,000 to 40,000 volts. In the case of vermiculites, the critical threshold value is 80,000 to 90,000 volts. In the case of fluorspar, the voltage is 90,000 to 100,000 volts, depending upon the amount of contaminate. Orthoclase requires still a higher voltage. Chromites require still a higher voltage which may be in the neighborhood of 200,000 volts; and Carborundum requires still a higher voltage.

In general, all of the materials which may be separated by levitation are essentially dielectric materials as distinct from materials having high conductivity, such as metallic minerals. An exception is noted, however, in the case of graphite which, in certain instances, may also be levitated; although at voltages somewhat lower than the critical levitation voltage, the graphite particles may oscillate between the electrodes without levitation.

It appears, however, that all dielectric materials may not be levitated in an electrode arrangement, as indicated above, and this appears particularly true in the case of semi-conductors, such as molybdenum disulfide and germanium oxide. In the case of such semi-conductors, it is considered desirable or necessary that a radio frequency field be present in addition to a direct current field to produce separation. Further, although a unidirectional or direct current field is considered essential for high efficiency, it is considered that levitation may also be produced, at least in some instances, using an alternating field of commercial power frequencies between the electrodes.

While the production of levitation is considered of importance and certain forms of the invention have been devised to produce levitation, other forms of the apparatus for producing separation of minerals contained in relatively small proportions in an ore involve the concept of using two electrodes, one of which is smaller than the other to produce a non-uniform field that increases in intensity in the neighborhood of the smaller electrode and/or the provision of baffle means near one of the electrodes to produce separation of different materials that are attracted in the direction of the positive electrode.

Other aspects of the present invention involve the adjustable nature of the electrodes, baffle means, and the material feeding means, so that the same may be positioned optimumly for separation of components of a particular ore.

An object of the present invention is to provide improved means and techniques having features indicated above.

A specific object of the present invention is to provide a process and apparatus for use of same whereby a suitable material relatively free from all foreign matter may be recovered or separated from appropriate ores.

Another specific object of the present invention is to provide a process and apparatus for achieving the separation of materials in finely divided form, which materials have resisted separation by prior processes relying on differences in chemical properties for separation by floatation or relying on differences in specific gravity for density separation.

Another specific object of the present invention is to provide a process and apparatus of the type described which permits economical and efficient separation of minerals from low grade ores, and the separation of other foreign or undesirable matter therefrom and permit recovery of minerals which have heretofore been unavailable for use.

Another specific object of the present invention is to provide an improved process and apparatus for separating uranium minerals from various ores.

Another specific object of the present invention is to provide improved means and techniques for separating lubricating materials, such as vermiculite and graphite, from ores.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURES 1–12, both inclusive, pertain to a first prototype embodying the features of the invention.

FIGURE 1 is generally a view in end elevation of a separator with certain portions, however, shown in section.

FIGURE 2 is a sectional view of the apparatus illustrated in FIGURE 1 in a direction indicated by the arrows 2—2 in FIGURE 3.

FIGURE 3 is an irregular sectional view taken substantially on the line 3—3 of FIGURE 1.

FIGURE 4 is a sectional view taken substantially on the line 4—4 of FIGURE 3.

FIGURE 5 is a perspective of a portion of an insulating partition illustrated in FIGURE 1.

FIGURE 6 is a perspective view of an insulating dowel pin used in supporting the electrodes in FIGURE 1.

FIGURE 7 is a perspective view showing an end portion of one of the electrodes.

FIGURE 8 is a sectional view through a modified form of apparatus and corresponds generally to the sectional view illustrated in FIGURE 2.

FIGURE 9 illustrates generally a portion of a second form of modification of the first prototype.

FIGURES 10 and 11 are sectional views taken generally as indicated by the lines 10—10 and 11—11, respectively, in FIGURE 9.

FIGURE 12 is a perspective view illustrating the manner in which the various electrodes are adjustably mounted.

FIGURES 13–24, both inclusive, illustrate a second prototype also embodying the features of the present invention.

Figure 13:
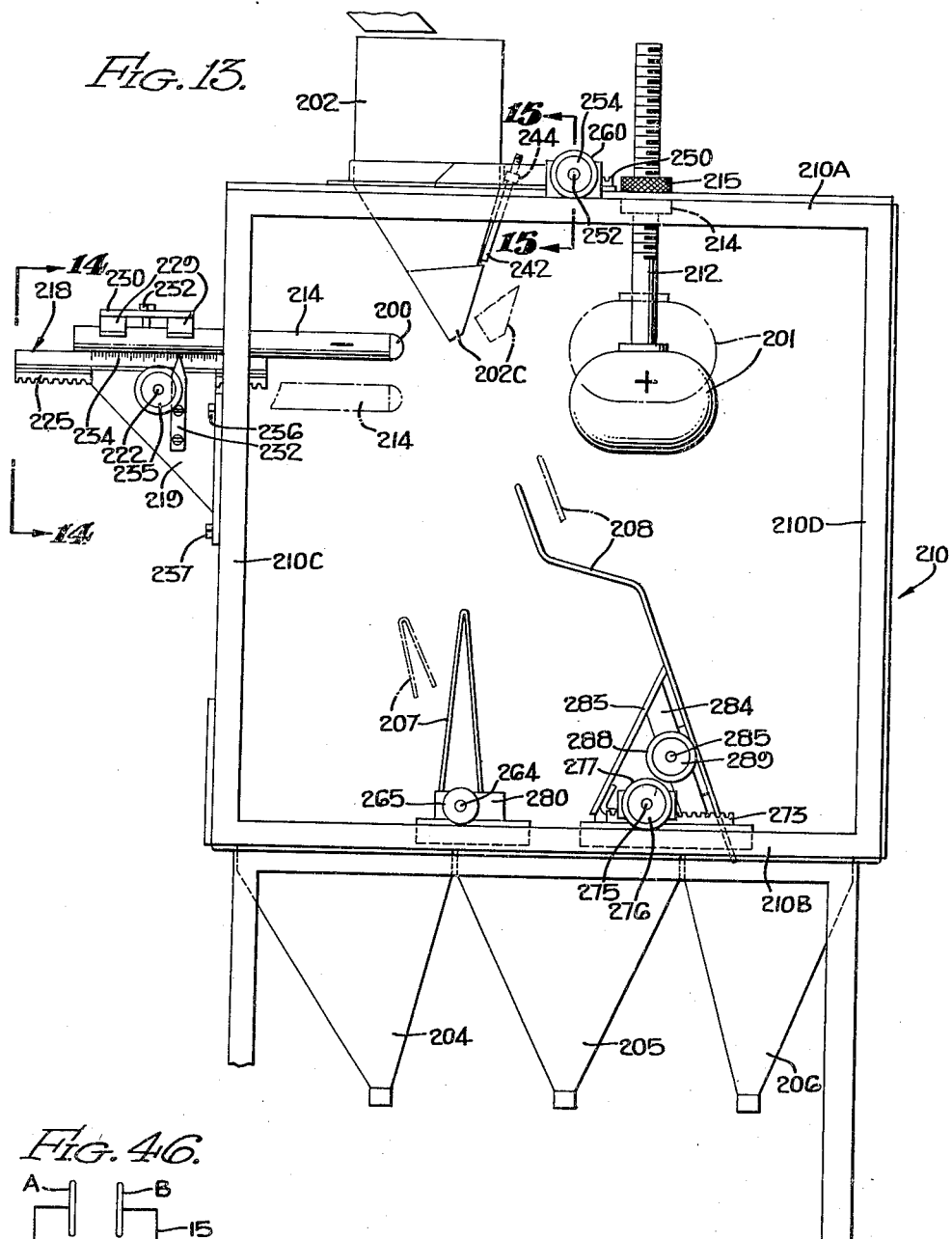

FIGURE 13 is generally a view in side elevation of a separator.

FIGURES 14 and 15 are views taken generally as indicated by the corresponding lines 14—14 and 15—15 in FIGURE 13.

FIGURE 16 illustrates in more detail a portion of the hopper adjusting mechanism illustrated in FIGURE 13.

FIGURE 17 is a perspective view showing one of the electrodes detached from its supporting structure.

FIGURE 18 illustrates different forms of electrodes which may be substituted for the electrode shown in both FIGURES 13 and 17.

FIGURES 19 and 20 are perspective views illustrating the mechanism for adjustably positioning corresponding insulating partitions illustrated in FIGURE 13.

FIGURE 21 is a sectional view taken substantially on the line 21—21 of FIGURE 20.

FIGURE 22 is generally a sectional view illustrating more of the details of the adjusting mechanism illustrated in FIGURE 19.

FIGURE 23 is a sectional view taken generally on the line 23—23 of FIGURE 22.

FIGURE 24 is generally a sectional view illustrating more of the details of the construction shown in FIGURES 20 and 13.

FIGURES 25–33, both inclusive, pertain to a third prototype embodying features of the present invention.

FIGURE 25 is a view in side elevation of a separator.

FIGURES 26 and 27 are sectional views taken on corresponding lines 26 and 27 in FIGURE 25.

Figure 28:
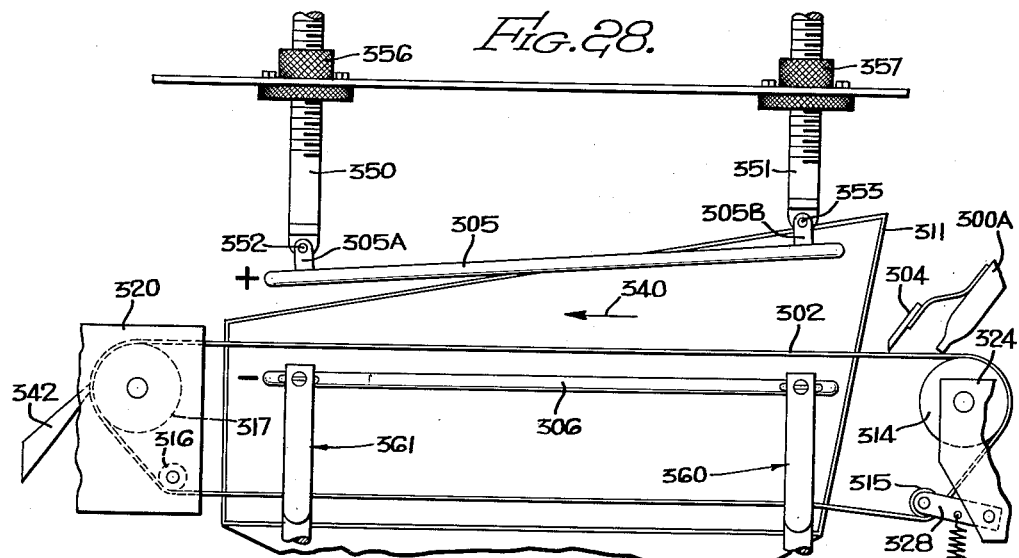

FIGURE 28 is a view of a modified apparatus and is a view corresponding generally to a view illustrated in FIGURE 25.

Figure 29:
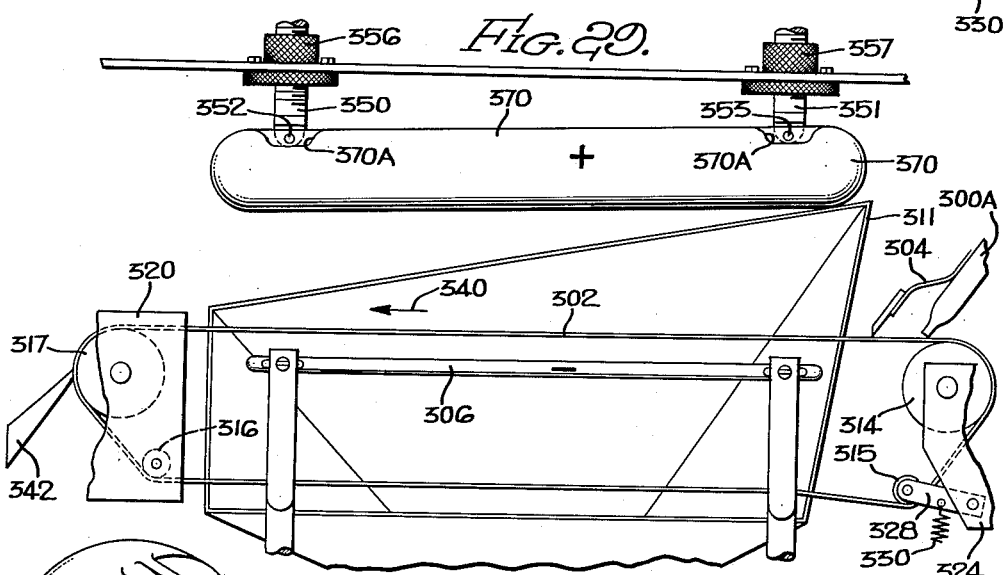

FIGURE 29 is a view similar to the views illustrated in FIGURES 25 and 28, but of a second modification in the above-indicated third prototype.

Figure 30:
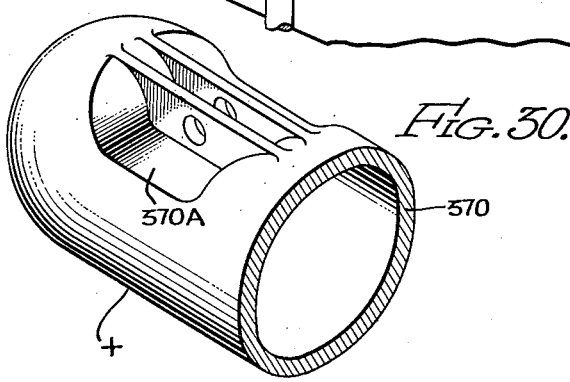

FIGURE 30 is a perspective view of a portion of an end of one of the electrodes illustrated in FIGURE 29.

FIGURE 31 illustrates a third modification in the above-indicated third prototype.

FIGURE 32 is a sectional view taken substantially on the line 32—32 of FIGURE 31.

FIGURE 33 is a perspective view of a portion of the apparatus shown in FIGURE 31.

FIGURES 34–42, both inclusive, illustrate a fourth prototype also embodying the features of the present invention.

FIGURE 34 is a view in side elevation of a separator.

FIGURES 35 and 36 are views taken generally as indicated by the lines 35—35 and 36—36 in FIGURE 34.

FIGURE 37 is a sectional view taken substantially on the line 37—37 of FIGURE 35.

FIGURE 38 is a sectional view taken substantially on the line 38—38 of FIGURE 36.

FIGURE 39 is a sectional view taken substantially on the line 39—39 of FIGURE 35.

FIGURE 40 is a perspective view of a portion of the apparatus shown in FIGURE 35.

FIGURE 41 illustrates a first modification in this above-indicated fourth prototype.

FIGURE 42 illustrates the manner in which the cleats may be attached and illustrates a second modification in this above-indicated fourth prototype.

FIGURES 43 and 44 illustrate a fifth prototype also embodying features of the present invention.

FIGURE 43 is a view in side elevation of a separator.

FIGURE 44 illustrates a first modification in the above-indicated fifth prototype.

FIGURE 45 illustrates a sixth prototype also embodying the features of the present invention.

Figure 46:
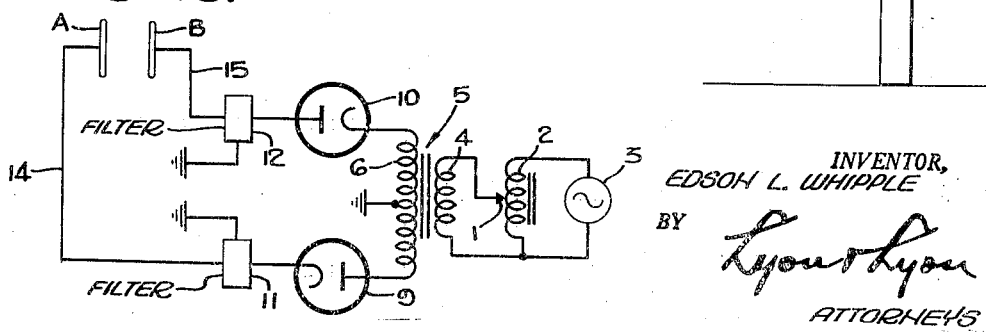

FIGURE 46 is a schematic diagram of a high voltage power supply used for energizing various electrodes shown in the previous figures.

FIGURE 47 is a sectional view through a modified form of apparatus and corresponds generally to the sectional view illustrated in FIGURE 2.

FIGURE 48 is a sectional view through a modified form of apparatus and corresponds generally to the sectional view illustrated in FIGURE 2.

FIGURE 49 is a top plan view of one of two identical electrodes in FIGURE 48 and corresponds to a view taken in the direction indicated by the lines 49, 49, the stippled portion on FIGURE 49 representing the region on which the material falls.

FIGURE 50 is a sectional view in enlarged form of the lower end of the lowermost electrode illustrated in FIGURE 48.

In all of the arrangements described herein, unless otherwise noted specifically herein, the various insulated electrodes have applied thereto a continuous or unidirectional voltage from a rectified power supply, illustrated in FIGURE 45, and the polarities of such electrodes are designated by plus and minus signs in FIGURES 2, 8, 10, 13, 18, 25, 28, 29, 30, 34, 43, 44 and 45. In those instances where alternating current of commercial power frequency, i.e. 50 or 60 cycles, is used, such use is described herein in connection with the particular prototype described under the particular heading appertaining to such prototype. In like manner, in those instances where ratio frequency energy is applied to the electrodes, such use is also described under the appropriate heading.

The materials or ores acted upon by the various electrode arrangements are described in conjunction with the description of the particular electrode arrangement. In general, the materials or ores, before being subjected to the various electrode arrangements, are comminuted or finely divided to such a size that the values are unlocked or freed from the gangue. For some ores, the maximum "freed" size is as much as one-half to one inch; while in other ores the crude must be ground to a pulp finer than 325 mesh to unlock the values.

The rectifying power supply may be of the form illustrated in FIGURE 46 wherein the oppositely charged electrodes are designated by the general reference numerals A and B.

This rectifying power supply allows a variable unidirectional voltage to be applied across the electrodes A and B, using for that purpose the adjustable tap 1 on an autotransformer 2, such as a Variac. The outside terminal is connected to a source 3 of commercial power. The tap 1 is connected to one terminal of the primary winding 4 of the step-up transformer 5, the other terminal of the primary 4 being connected to one terminal of the autotransformer 2. The secondary winding 6 of the transformer has its center tap grounded and the outside terminals thereof connected respectively to the anode and cathode of high voltage rectifier tubes 9 and 10. The cathode of tube 9 is connected to the electrode A through a filter 11 and the anode of tube 10 is connected to the anode B through filter 12. The connecting leads 14 and 15 may be of low current carrying capacity and typify those connections to the various electrodes designated generally in FIGURE 46 by the letters A and B.

Using a rectifying power supply, as described in FIGURE 45, the electrode A in which the center tap of the secondary winding is grounded, the electrodes A and B are at equal but opposite polarities with respect to ground, and the region midway between the electrodes A and B may thus be considered to be at ground potential. It is substantially in this region that the material in comminuted form is introduced into the space between the various electrodes; and such material introduced in the electrodes may likewise be considered to be at ground potential since it enters from a reservoir or hopper that is substantially of ground potential.

*Description of prototype No. 1 shown in FIGURES 1–10, both inclusive, and FIGURES 47 and 48*

This prototype includes the apparatus described in FIGURES 1–7, a first modification shown in FIGURE 8 and a second modification shown in FIGURES 9–12.

The apparatus shown in FIGURES 1–7 includes generally a framework 10 which mounts at the upper end thereof a material chute 11 from which material gravitates in metered amounts so as to fall between a first pair of horizontally extending tubular electrodes 12 and 13 so as to be subjected to the electrostatic field existing between the electrodes 12 and 13.

The framework 10 is generally of rectangular box construction having vertical supporting members 10A which are joined with horizontally extending members 10B. The material which is to be separated is fed into the hopper 11 of generally triangular cross-section, as shown in FIGURE 2. It is understood that many different arrangements may be used to feed the material between the electrodes in metered amounts, and the one illustrated herein is particularly useful where the material, such as for example crude vermiculite, is not particularly abrasive. The bottom opening in such hopper 11, however, is closed by a longitudinally grooved cylinder 15 which has a series of grooved portions 15A. This cylinder 15 is rotated at an adjustable speed by a motor 16 (FIGURE 1) which is mounted on a bracket 17 attached to the upper end of the framework 10. The motor 16 drives a speed reduction unit 18 having a pulley 19 on the output shaft of such speed reduction unit. A belt 20 on the pulley 19 passes over the pulley 22 which is mounted on a shaft 23. This shaft 23 is coaxial with the element 15 and is attached to the aforementioned cylinder 15 in the nature of a metering device to drive the same in such a manner as to assure a substantially uniform flow of material between the electrodes 12 and 13 in a controllable rate. The rate may be conveniently adjusted by varying the speed of the motor 16, using conventional speed controlling means (not shown) for that purpose. The upper end of the framework 10 is closed by a pair of plastic sheets 20 and 21 that have their opposite edges engaged with horizontally extending angle iron members 24, 25, 26 and 27, as shown in FIGURE 2, such angle iron members being, of course, affixed to the framework. This mounting of the insulating cover members 20 and 21 allows easy removal when desired.

The framework 10 has affixed thereto a pair of vertically extending side walls 27 and 28 of insulating material for purposes of providing an insulating baffle, as well as for the purpose of providing a supporting means. The framework is provided also with a pair of end walls 30 and 31 of insulating material, each of which has a series of uniformly spaced apertured portions for adjustably supporting the various electrodes and insulating baffle members as described hereinafter.

All of the electrodes in this particular prototype comprise hollow tubular metallic elements, preferably of aluminum with rounded ends formed as shown in FIGURE 7, adapted, however, to receive a cylindrical insulating rod 34 for convenient mounting. Each of the electrodes has the same cross-sectional diameter, the diameter, as shown, being four inches. These electrodes in FIGURE 2 include not only the top electrodes 12 and 13 but also a pair of bottom electrodes 37 and 38. Each of these electrodes has its ends formed as shown in FIGURE 7 to receive the insulating cylinder 34, into which insulating dowel pins 40, as illustrated in FIGURE 6 are inserted. Such dowel pins 40 are receivable in any one of the aforementioned apertured portions in the end insulating walls 30 and 31, such that they may be conveniently removed and placed in different apertured portions in such walls 30 and 31 to thereby effect a convenient adjustment of the positions of any one of such electrodes. Such dowel pins 40, in FIGURE 6, are used also to adjustably support the series of insulating baffle members 50, 50A, 51, 51A, 52, 53, 54 and 55.

Each of these baffle members 50—55 has a pair of apertured insulating blocks 57 secured to opposite ends of the same, and these blocks are provided with an apertured portion 57A to receive a dowel pin 40 which extends not only through such apertured portion 57A but also to the corresponding apertured portion in the end walls 30 and 31 to mount the upper ends of the corresponding baffle members. By such arrangement, each of the baffle members 50—55 is pivoted on the end walls 30 and 31 and their particular angular position, as shown in FIGURE 2, is established by the use of an additional dowel pin 40 for each insulating baffle member. Thus, as shown in FIGURE 2, there is a pair of dowel pins 40 used to adjustably position a corresponding baffle member 50—55.

It is noted that the baffle members 50 and 51 extend divergently between the corresponding electrodes 12, 13 on the one hand and the corresponding conveying belts 64, 65 on the other hand. The baffle members 50A, 51A converge downwardly and extend generally from the corresponding electrodes 12, 13 to a region above the lower electrodes 37, 38 to direct flow of material between such lower electrodes. The baffle members 52 and 53 also, in the case of the baffles 50 and 51, have their planes extending downwardly and outwardly. The planes of the baffle members 52 and 53 extend generally tangentially with respect to the circular electrodes 37 and 38. The lowermost pair of baffle members 54 and 55 have their planes extending downwardly and generally inwardly in converging manner, and the upper ends of such baffles 54 and 55 terminate above the lower ends of the baffles 52 and 53.

Each of the arrangements described under this prototype contemplates levitation of some of the material. Thus, in FIGURE 2, that material which is levitated from the region between the electrodes 12 and 13, as indicated by the arrows 60 and 61, gravitates onto the upper reach of the belts 64 and 65. The arrangement illustrated in FIGURE 2 contemplates a second stage of levitation of material from the space between electrodes 37 and 38, as indicated by the arrows 67 and 68. This material thus levitated in the second stage ultimately gravitates onto the upper reach of the pair of spaced belts 70 and 71.

Second stage levitation takes place because electrodes 37 and 38 are at the same potential difference as the difference between electrodes 12 and 13, but electrodes 37 and 38 are spaced closer together. This causes a component to become activated and levitated which was not levitated under the conditions of stress between electrodes 12 and 13.

That material which is not levitated either by the field between electrodes 12 and 13 or between electrodes 37 and 38 continues in its vertical path and passes between the baffle members 54 and 55, as indicated by the series of vertical arrows 72, 73, 74 and 75.

The unlevitated material falling between the baffles 54 and 55 may fall into a suitable hopper or be collected on an endless belt (not shown) from which the material may ultimately be collected, as in the base of belts 64, 65, 70 and 71. The material thus placed on the belts may be collected in suitable hoppers, as shown in FIGURE 3, wherein the hopper 78 collects the material from belt 64 and the hopper 79 collects the material which gravitates therein from belt 70.

These various belts 64, 65, 70 and 71 of insulating material may be driven in conventional manner using, as exemplified in FIGURE 1, driving pulleys 80 and 81 which are driven by corresponding motor driven shafts 82 and 83, such shafts 82 and 83 being journalled for rotation in suitable bearings 84, 85, mounted on the framework 10.

In the arrangement shown in FIGURE 8, material from the hopper 11 is fed in the same manner as described above at a uniform controllable rate so as to fall in the space between the upper pair of electrodes 87 and 88 corresponding to the electrodes 12 and 13 in FIGURE 2. The unlevitated material gravitates through the space, as indicated by the arrow 89, while the levitated material is moved in the general direction, indicated by the arrows 90 and 91, and ultimately fall onto the horizontal extending baffle members 93 and 94 which, in this instance, serve as a collecting plate. The planes of these plates extend generally horizontally and are adjustably mounted by dowel pins 40, as described above. It is noted that the planes of these plates 93 and 94 pass through the cylindrical electrodes 87 and 88, and each has one end thereof terminating at the corresponding electrode 87 and 88 and the other end terminating at the corresponding walls 27 and 28.

Here again in FIGURE 8, a levitation process is produced between electrodes 87 and 88 as indicated by the arrows 90 and 91, and such electrodes serve also to deflect some of the material in the general direction indicated by the arrows 90A and 91A into the corresponding hoppers defined on the one hand by the pair of downwardly converging baffles 90B, 90C and on the other hand by the pair of similar downwardly converging baffles 91B, 91C. That portion of the material which is neither levitated nor appreciably deflected by the electrodes 87 and 88 continues vertically downwardly as indicated generally by the arrow 89 into the hopper defined by the pair of downwardly converging baffle members 130 and 131 for discharge into the region between electrodes 96 and 97, which are spaced further apart than electrodes 87, 88. Some of the material falling between electrodes 96 and 97 continues in its vertical path as indicated generally by the arrow 100, but other portions are deflected into bins 104 and 109, as indicated by the arrows 100A, 100B, respectively.

The material discharged from the bin 90B, 90C is subjected to the field between the horizontally spaced electrodes 96, 102 so that one portion thereof is deflected into bin 104 as indicated by the arrow 100C, while the other portion thereof is deflected into bin 106 as indicated by the arrow 100D. A vertical baffle 105 separates bins 104 and 106.

Likewise, the material discharged from bin 91C, 91B is acted upon by the field between electrodes 97, 108 to deflect one portion thereof into bin 109 and the other portion into bin 112. The baffle 110 separates bins 109 and 112.

It is noted that the material thus collected in bins 106 and 109 is the same mineral. Likewise, the same mineral appears in bins 104 and 112. Thus, four separations are accomplished, namely, (1) separation of the levitated material, (2) separation of material on belt 101, (3) separation of material in bins 104, 112 and (4) separation of material in bins 106, 109.

In the arrangement shown in FIGURE 10, material in hopper 11 is fed at a uniform control rate by conventional means, the choice of the particular means being dependent to some extent on whether the material is abrasive or not abrasive; and although a form of feed mechanism is shown for feeding non-abrasive materials, it is understood that such mechanism is also representative of other forms of material feed mechanisms for feeding materials that are abrasive in character. The feed mechanism shown includes a longitudinally grooved cylinder 15 which, in this instance, is disposed within the confines of the hopper 11. The material thus fed uniformly gravitates into the space between the centrally disposed electrodes 145 and 146. A portion of such material gravitates between such electrodes, as indicated by the arrow 147, and is collected on the endless belt 148 while other portions of the material are levitated, as indicated by the arrows 148 and 149, and such levitated material ultimately gravitates onto the corresponding endless belts 151 and 152. A pair of insulating cover plates, similar to the aforementioned cover plates 20 and 21, are designated at 154 and 155. A pair of insulating deflecting plates 157 and 158 each has its ends secured to corresponding electrodes 145 and 146 and has its lower ends extending below and contacting the upper ends of corresponding insulating baffle plates 159 and 160. It is noted that the planes of the baffle members 157 and 158 extend generally downwardly and inwardly while the other baffle plates 159 and 160 have their planes extending generally downwardly and outwardly with the lower ends of the plates 159 and 160 terminating near the endless belts 151 and 152. The endless belts 151 and 152 are driven by pulleys 160 and 161, while the other endless belt 148 is driven in similar manner by pulley 163.

In the arrangement shown in FIGURE 47, the material from chute 165 gravitates between a first pair of elevated electrodes 166, 167, and is also subjected to the electrostatic field between other pairs of electrodes with the concentrates comprising 19% of the feed material and being collected in the bins 168–175, inclusive, and the tailings comprising the other 81% of the material and being collected in the bins 176, 177 and 178.

In general, the various electrode pairs are spaced closer together progressively in the direction extending from the top of the chamber 179 to the bottom so that as the material gravitates, it is subjected to an increased field intensity after the material leaves an upper pair of electrodes and gravitates between a lower pair of electrodes.

Thus, approximately 60% of the material falling into the space between electrodes 166 and 167 continues downwardly as indicated by the vertical arrow 180, while the remaining 40%, in the form of middlings, is deflected outwardly as indicated by the arrows 181, 182 into the bins 183, 184, which are defined respectively, on the one hand, by the pair of downwardly converging baffle members 185, 186, and, on the other hand, by the downwardly converging baffle members 187, 188.

The material flowing from bins 183 and 184 is subjected to a more intense field which exists, on the one hand, between electrodes 189, 190, and, on the other hand, between electrodes 191, 192, at each pair of which the concentrates are deflected in the receptacles 168, 170 and 169, 171, as indicated by the arrows, while the material in the form of middlings, i.e. material containing concentrates and tailings, continue their gravitation downwardly into corresponding bins 193A, 194A, as indicated by the vertical arrows 193, 194 and then into the space defined respectively by the electrode pairs 195, 196 and 197, 198.

Some of the concentrates in such middlings falling between the electrode pairs 195, 196 and 197, 198 are deflected into corresponding receptacles 172, 172A and 173, 173A, while the remaining middlings gravitate into the bin 199 which is defined by the downwardly converging baffle members 199A and 199B.

All of the middlings leaving bin 199 are subjected to the more intense field between electrodes 199C, 199D, so that some of the concentrates are deflected directly into receptacles 174, 175 without being further acted upon electrically, while the middlings continue downwardly as indicated by the vertical arrow 199E into the still more intense field between the lower electrodes 199F, 199G which serve to deflect substantially all of the remaining concentrates into the receptacles 174 and 175 with the tailings being deposited in receptacle 178.

Those middlings falling between the electrodes 199H, 199J, as represented by the vertical arrow 180, undergo a partial separation with a portion of the middlings being deflected into the bins 199K, 199L, and the other portion of such middlings continues vertically downwardly into the bin 199M, as indicated by the vertical arrow 199N and then into the more intense field which exists between electrodes 199P, 199Q.

The middlings thus deflected into the bins 199K, 199L are subjected to the more intense field between the electrode pairs 199R, 199S and 199T, 199U. Some of the middlings passing between the electrodes 199R, 199S are deflected into the bins 198A, 198B, and the remaining middlings gravitate into the bin 198C. Similarly, some of the middlings passing between the electrodes 199T, 199U are deflected into bins 198C, 198D, and the remaining middlings gravitate into the bin 198C and then into the more intense field between the electrodes 198E, 198F through which tailings gravitate into the receptacle 177 while middlings are deflected into the aforementioned bin 199 and then subjected to the field between the electrodes 199C and 199D to obtain the results mentioned above.

It is noted that those tailings collected in the bins 198A, 198B are allowed to gravitate into the bin 193A from which they gravitate in the space electrodes 195, 196 to obtain the results previously described. Similarly, the middlings collected in bins 198C, 198D are allowed to gravitate into the bin 194A from where they are discharged into the space between electrodes 197 and 198 to obtain the further separation described above.

Satisfactory results have been obtained using the arrangement shown in FIGURE 47 with a conglomerate uranium ore from the Wind River District in Wyoming. In such case a total of 19% of the concentrates has been separated with 6% being collected in each of bins 170, 171, 1% in each of bins 172, 172A, 173, 173A and 1½% in each of bins 174, 175. Thirty percent of the tailings appear in bin 176, 20% in bin 177, and 31% in bin 178. The exact uranium minerals have not been identified in this ore, but it is composed of sand and gravel cemented loosely with a clay-like mineral which appears to be the host to the uranium minerals.

In the arrangement shown in FIGURE 2 satisfactory results have been obtained using 4" dia. electrodes with the electrodes 12, 13 spaced 7" apart, center to center, with the electrodes 37, 38 spaced 6" apart, center to center, and with a voltage of the polarity indicated between adjacent electrodes of 45 kilovolts, using schroeckingerite in a sandy clay "gumbo." The schroeckingerite is collected on the belts 64, 65, 70 and 71. The ore is conditioned so that all particle sizes are smaller than 35 mesh and levitation occurs as indicated by its arrows 60 and 61. Usually levitation occurs at all field intensities above 10 kilovolts per inch with maximum recovery usually occurring when the gradient is 20 kv. per inch.

Satisfactory results have also been obtained using a non-uranium ore containing 20% $CaF_2$. The ore is gravitated in such case between a pair of electrodes having a diameter of 2" or more, spaced approximately 3" apart at a voltage of 90 kv. In such case the $CaF_2$ is selectively deflected towards the negative electrode and is collected in a bin under the negative electrode with some of the gangue falling vertically, and the remaining portion of the gangue being deflected towards the positive electrode. In such case all particles are less than ½" in diameter.

Satisfactory results using the arrangement shown in FIGURE 8 has been obtained using an ore containing carnotite in contact zones of sedimentary silicates and diatomaceous earth with 4-inch diameter electrodes, the electrodes 87, 88 being spaced 7", with the other three pairs of electrodes 96, 97 and 96, 102 and 97, 108 being each spaced 8" apart. The voltage used was 75 kv. between electrode pairs. The diatomaceous earth is collected in bins 93, 94; a siliceous gangue at 101; the carnotite concentrate at 106 and 112; and carnotite middlings at 104, 109 for recycling. All particle sizes are less than 35 mesh and levitation occurs as indicated at 90 and 91.

Satisfactory results have been produced using the arrangement shown in FIGURE 10 with an ore containing carnotite in diatomaceous earth. The 4" electrodes 145, 146 are spaced 9½" between centers, and a voltage of 140 kv. is applied between the same. The diatomaceous earth is collected in bins 151, 152 and carnotite is collected at belt 148. All particle sizes are less than 35 mesh and levitation occurs as indicated by the arrows in FIGURE 10.

In the arrangement shown in FIGURE 48, the material from chute 180A gravitates between a first pair of elevated electrodes 180C and 180D. A portion of the material is deflected and travels in the direction indicated by the arrows 180E and 180F and gravitates into corresponding bins 180G and 180H. The other portion of material gravitates into the space between the next pair of electrodes 180J and 180K which are spaced closer than the electrodes 180C and 180D to produce an increased voltage gradient between the electrodes 180J and 180K. Some of the material is deflected and travels in the direction indicated by the arrows 180L and 180H and into the bins 180G and 180H, while the undeflected material is subjected to the electrostatic field between the third pair of electrodes 180N and 180P where the same type of action again results with some of the material being deflected so that it may pass into the bins 180G and 180H, while the other portion gravitates into the space between the fourth pair of electrodes 180Q and 180R. In like manner, the electrodes 180Q and 180R serve to deflect some of the material into the bins 180G and 180H, while a portion falls directly into the hopper 180S.

It is understood that the spacing between the four pairs of electrodes is such that the material falling between the same is subjected progressively to a higher electrostatic field, which is conveniently obtained by spacing the lower pairs of electrodes closer than the pair immediately above the same.

In effecting this separation, preferably a pair of generally T-shaped deflecting plates 180T, 180U are disposed, as shown, between the vertically disposed pairs of electrodes. Also for this purpose in assuring separation, the bin or hopper 180S is defined by a pair of upwardly converging plates 180V, 180W.

Using such multiple arrangement of electrodes, the tailings which comprise approximately 50% of the total feed accumulate in the hopper 180S, while the remaining 50% comprising middlings accumulate in substantially equal amounts in the bins 180G and 180H. The middlings in the bins 180G and 180H are allowed to gravitate in generally sheet form, as indicated by the stippled portion, onto a pair of negatively charged electrodes 180X, 180Y. These electrodes 180X and 180Y are inclined and have their lower ends terminating at a point which is defined by the substantially straight upper side 180Z and lower curved surface 180I so as to develop a relatively high field intensity at such lower point to which the middlings gravitate in their passage down the upper surfaces 180Z. As the middlings reach such lower end or edge of the electrodes 180X, 180Y, a portion thereof is levitated, as indicated by the arrows 181A and 181B, and thus directed into corresponding bins 181C and 181D. That portion of material which is not levitated gravitates, as indicated by the arrows 181E and 181F, into the corresponding bins 181G and 181H. The concentrates comprising about 15% of the total feed is collected in the bins 181C and 181D, and 35% of the total feed in the form of middlings is collected in the bins 181G and 181H.

The proportions given above in connection with FIGURE 48 are those proportions obtained in the recovery of uranium minerals from so-called Wind River ore.

It is noted that the arrangement in FIGURE 48 involves the use of electrodes 180X and 180Y which are contacted by the middlings from bins 180G and 180H. The electrodes 180X and 180Y are maintained at a voltage approximately 75 kilovolts negatively with respect to ground; and it has been observed that the particles are not attracted to or influenced by the field of positive polarity or by a surrounding grounded region. It is considered, however, that it is not necessary to have an oppositely charged electrode or a grounded region to make a separation.

*Description of prototype No. 2 shown in FIGURES 13–24, both inclusive*

The apparatus shown in FIGURES 13–24 includes a pair of electrodes 200, 201 of different configuration which are both adjustably supported to develop a non-symmetrical electrostatic field through which material from an adjustably positioned hopper 202 gravitates. The action is such that different components of the material are selectively deflected and guided into one of the three hoppers 204, 205 and 206. A pair of adjustably positioned insulating deflectors 207 and 208 aid in producing the segregation into the three hoppers.

The electrodes, hopper and insulated baffle members are all adjustably supported on a generally rectangular box-shaped framework 207 having spaced horizontal members 210A, 210B and vertical members 210C, 210D. The electrode 201, in the form of a flattened solid cylinder with all of the corners rounded off, is mounted on the lower end of an insulated screw-threaded rod 212, such rod being threaded into a nut 214 mounted on the upper frame member 210A. By this means the electrode 201 is adjustably positioned vertically, and when adjusted, such adjustment is maintained by the knurled locking nut 215 on the threaded rod 212.

The electrode 200, as illustrated in FIGURE 17, comprises an elongated horizontally extended bar having substantially a semi-circular cross-section with the elongated curved portion thereof facing the other electrode 201. This electrode 200 is secured to a pair of horizontally extending insulating sleeve supports 214 and 215 by the pins 200A and 200B extending from the electrode 200. High voltage leads are suitably fastened to the electrodes 200, 201.

These insulating supporting rods 214 and 215, as shown in FIGURE 14, are clamped on a horizontally movable carriage 218 which is slideably mounted on the bracket 219, the bracket 219 being secured to the frame member 210C. This carriage 218 is movable by a rack and pinion mechanism including the pair of pinions 220 and 221 on the shaft 222 which in turn is rotatably supported in the bracket 219, the pinions 220 and 221 being engageable with rack members 224 and 225, respectively, mounted on the underside of the carriage 218.

More specifically, the insulating supporting rods 214 and 215 are disposed between upper faces on the carriage 218 and angle iron members 228 and 229, respectively. These angle iron members 228 and 229 are engaged by the plate 230, having an enlarged apertured portion through which the bolt 232 passes. The bolt 232 is threaded into a portion of the carriage to thereby provide a clamping structure.

The carriage 218 has a pair of elongated portions 218A and 218B which cooperate with the bracket extensions 219A and 219B for slideably supporting the carriage and to guide such carriage in its movement. The carriage 219 is moved by turning the knurled nut 235 which is mounted on the shaft 222 for purposes of providing a continuous adjustment of the electrode 200 with respect to the other electrode 201. Once the desired adjustment is made, such adjustment is maintained by tightening the knurled locking nut 230. This nut 230 is threaded on the shaft 222 and has a portion thereof engageable with the bracket 219 for this purpose. Preferably, indicating means are provided for indicating the position of the spacing between the electrodes 200 and 201, and such indicating means in this instance takes the form of a pointer 232 secured to the bracket 219 and cooperating with a calibrated scale 234 on the carriage 218.

Means are provided for adjustably supporting the electrode 200 in a vertical direction, as indicated by the phantom lines in FIGURE 13. For this latter adjustment, the bracket 219, as a unit, with all of the elements supported thereon, may be detached from the vertical frame member 210C and secured to such frame member 210C at a lower elevation thereon; and for this purpose, releasable bolts 234, 235, 236 and 237 are used to releasably secure such bracket 219 on the frame member 210C.

The hopper 202 is adjustably supported on the upper frame member 210A for continuous horizontal movement so as to allow the discharge opening 202A of the hopper with respect to the electrodes so that the discharge point of the material in the electrostatic field may be conrolled. The size of the opening 202A may be controlled by positioning gate element 240 which is slideably mounted between the stationary elements 202B and 202C of the hopper. All of the elements of the hopper, including the gate 240, are of insulating material. The upper end of the gate element 240 has secured thereto a threaded insulating rod 242 which passes through the threaded nut 244. This nut 244 engages the apertured portion of the member 246 which in turn is secured to the hopper 202. The position of the knurled nut 244 thus determines the size of the opening 202A and thus the rate at which material graviates between the spaced electrodes.

For purposes of changing the horizontal position of the hopper 202, a rack and pinion mechanism illustrated in detail in FIGURE 15 is provided. The rack portion of such mechanism, namely the rack 250, is secured to the member 246 and cooperates with the pinion 251 which is secured on the rotatable shaft 252. This shaft 252 mounts a knurled nut 254 and is journalled for rotation in the spaced angle iron members 255 and 256, both of which are secured to the horizontal frame member 210A. The angle iron member 256, for this purpose, is secured to the plate 258 which in turn is secured to the frame member 210A. The plate 258 serves as a bearing surface upon which the hopper assembly slides. A knurled locking nut 260 is threaded on the shaft 252 and has a portion thereof engageable with the angle iron member 255 for purposes of locking the shaft 252, i.e., the hopper in a horizontally adjusted position.

The insulating baffle member 207 of generally triangular cross-section is pivoted on the framework, as shown in FIGURE 20. The lower ends of the folded insulating member 207 are spaced by a block 262 through which the shaft 264 extends. The block 262 is secured to such shaft 264, as well as the insulating member 207.

The shaft 264 is journalled for rotation near opposite ends thereof in spaced frame members, the frame member 210B only being shown in FIGURE 20. The shaft 264 may be turned by the knurled nut 265 mounted thereon. A locking nut 266 is threaded on the shaft 264 and has a portion engageable with the frame member to secure the baffle 207 in an angularly adjusted position. By this means, it is apparent that the baffle member 207 may be adjusted in either one of the directions indicated by the arrows 268 and 269.

The other baffle member 208 may be moved continuously to different adjusted positions in the direction indicated by the series of arrows 270 and 271 in FIGURE 19. In order to produce the movement indicated by the arrow 271, the frame member 210B has a rack member 273 mounted thereon in meshing engagement with a pinion 274 (FIGURE 22) mounted on the shaft 275. The shaft 275 mounts the knurled nut 276 which is used to turn such shaft. The locking nut 277 threaded on the shaft 275 is engageable with a portion of the frame to secure the baffle in a horizontally adjusted position. It is noted that the shaft 275, for these purposes, passes through spaced walls of the U-shaped member 280 which is bolted to the support or carriage 282. Such carriage 282 supports plates 283 and 284. The plate 284 serves as a bearing support for the shaft 285 which has secured thereto a pinion 286. This pinion 286, as shown in FIGURE 22, cooperates with the rack member 287, mounted on the baffle member 208. The shaft 285 mounts a knurled nut 289 which in turn causes the baffle 208 to move in the direction indicated by the arrows 270 to different adjusted positions. Once adjusted, this adjustment may be secured by the locking nut 288, threaded on the shaft 285, and having a portion thereof engageable with the plate 284.

In order to provide guided movement of the baffle member 208, a guide structure, illustrated in FIGURE 23, is provided. This guide structure includes an angle iron member 290 mounted on the shaft 285 and having one leg thereof slideably received between the mounting plate 292 and the member 293 secured to the mounting member 292. This mounting member 292 also mounts the baffle 208.

While the electrode 200 is shown in FIGURE 18 in the form of an elongated bar, the electrode 200 may have other forms and shapes to produce a desired unsymmetrical field. For example, the electrode 200 may have different cross-sections. For example, such electrode may be pointed, more or less rounded. Thus, the cross-section of the electrode 200 may be a cross-section of any one of those illustrated in FIGURE 18 wherein the electrodes 200A, 200B and 200C are shown.

In the arrangement shown in FIGURE 13, satisfactory results have been obtained in the separation of kasolite and uranophane. The electrode 200 is semi-circular of 1″ diameter stock and electrode 201 is 5⅞″ across with the spacing between closest points of the electrodes being 5″. The voltages used may be in the range of 60 to 100 kv. The limestone travels in the direction of decreasing gradient away from the smaller electrode. The uranium minerals are unaffected with a 5″ spacing and an average overall gradient of 20 kv. per inch. At higher field intensities uranophane is attracted to the smaller electrode and falls into bin 204. Kasolite is collected at 205. All particle sizes are smaller than 35 mesh and no levitation occurs.

With respect to the electrodes shown in FIGURE 18, the electrode 200A is preferably used in all voltage ranges between 45 kv. and 75 kv. The electrode 200B is used for lower voltages, and electrode 200C is preferably used for all voltages above 75 kv.

The arrangement shown in FIGURE 13 has also been used to effect separation in non-uranium bearing ores, such as low grade wolframite concentrate (40% $WO_3$), containing about 50% monazite. The electrodes are spaced 5″ apart with the negative electrode having a ½″ radius and the positive electrode having a 2″ radius. When the air is dry, 150 kv. is applied between the electrodes. The wolframite strikes the positive electrode but is repelled therefrom when a small insulated plastic rod is inserted or passed between the electrodes. The monazite remains on the positive electrode and is removed either batchwise or continuously, using an insulated wiper blade. All particle sizes are less than 60 mesh and no levitation occurs.

*Description of prototype No. 3 shown in FIGURES 25–33, both inclusive*

In the arrangement illustrated in FIGURES 25–27, a hopper 300 is mounted on a rectangular frame 301 and serves to direct material onto the upper reach of the belt 302. A spreader 304, mounted on the lower end of the spout 300A, serves to even the material so disposed on the belt 302 so that a uniform layer of the material is subsequently subjected to the field between the upper electrode 305 and the lower electrode 306. The upper reach of the belt 302 passes between the spaced horizontally extending electrodes 305 and 306, and a portion of such material acted upon by the electrostatic field is levitated from the belt and generally moved in the direction indicated by the arrows 308 and 309. Subsequently, such material travelling in the general direction indicated by the arrows 308 and 309 gravitates into the laterally disposed hoppers 310 and 311 having discharge spouts 310A and 311A, respectively. The remaining portion of the material which is not levitated travels through the field and is ultimately deposited in the hopper 312. The belt 302 contacts the guide pulley 314, the tensioning pulley 315, the guide roller 316 and the driving pulley 317, all of which have their opposite ends respectively journalled for rotation on brackets which are in turn secured to the framework 301. Thus, the pulley 317 and roller 316 have their ends journalled for rotation in the brackets 320 and 321, and, similarly, the roller 314 is journalled for rotation in the pair of spaced brackets 324 and 325.

The tensioning roller 315 is rotatably mounted on one end of a pair of arms 328 having their other ends pivotally supported on the brackets 324 and 325. The tension spring 330 has one of its ends connected to an intermediate point on the arms 328 and the other one of its ends attached to the framework 301 so as to assure tensioning of the belt 302 and thus maintain the good driving relation with the pulley 317 which is driven by the motor 332 supported on the frame bracket 334. The output shaft of the motor 332 drives a gear reduction unit 335 having a pulley 336 on its output shaft. This pulley 336, rotating at a relatively low speed, is coupled to the driving pulley 337 through belt 338 with the result that the belt 302 is continuously driven in the direction indicated by the arrow 340.

A small chute 342 is mounted on the framework 301 with its upper end adjacent the belt 302 to direct flow of material into the chute 312.

Both of the electrodes 305 and 306 have their planes extending generally horizontally and parallel and are each adjustably supported using a supporting structure which is presently described.

While satisfactory operation is obtained with the electrodes extending horizontally, preferably only the bottom electrode is horizontal with the top electrode adjusted so that it is slightly (an inch or so) further away from the bottom electrode on the end upon which the ore is introduced. This causes the material which remains on the moving belt to move into a more intense field as it passes between the electrodes. The plate type electrode 305 is provided with a pair of upward extending bifurcated studs 305A and 305B into which the lower ends of the insulating threaded supporting rods 350 and 351 extend. As shown in FIGURE 27, the electrode 305 is pin connected by means of pins 352 and 353 to the insulating supports 350 and 351, respectively. These insulating supports or posts 350 and 351 are threaded in bushings 356 and 357 which are mounted on the framework. Thus, to secure an adjustment of electrode 305, the pins 352 and 353 are removed, the electrode 305 is lowered, the supporting posts 350 and 351 then rotated to the desired adjusted position and the electrode 305 is again pin connected to the supports 350 and 351. The lower electrode 306, as shown in FIGURE 27, has its ends supported on a pair of spaced insulating adjustable yoke members 360 and 361. A pair of bolts 362 and 363 (FIGURE 27) are threaded into the upper arms of the yoke members and engage the electrode 306. Similar bolts 364 (FIGURE 25) are associated with the other yoke member 360. These yoke members 360 and 361 are threaded in bushings 368 and 369, respectively. Thus, it is apparent that upon releasing the fastening bolts 362, 363 and 364, the individual yoke members 360 and 361 may be rotated in their corresponding bushings to different desired supporting positions. Each of the threaded bushings used to adjustably support the electrodes may be secured to the framework 301, as shown in FIGURE 26.

These adjustment features allow electrodes to be positioned in different positions with respect to each other. For example, in FIGURE 25 the electrodes 305 and 306 have their planes extending generally parallel and horizontally while the same mechanism is adjusted, as shown in FIGURE 28, to maintain the lower electrode 306 horizontally but yet to maintain the upper electrode 305 in a tilted position, i.e. with the electrode 305 extending downwardly and in the direction of belt travel 340 so that the material on the belt 302 is subjected to a substantially continuously increasing voltage gradient.

In FIGURE 29 the same structure is provided as in FIGURES 25–28, with the exception that a cylindrical electrode 370 replaces the plate type electrode 305. This electrode 370, as shown in FIGURE 30, may comprise hollow tubing having its ends rounded, as shown in FIGURE 30, and provided with a suitable socket 370A for releasably receiving the lower ends of the insulating supporting rods 350 and 351. Releasable pins 352 and 353 secure the supporting rods 350 and 351 into the electrode 370. It is noted that the electrode 370 is disposed above electrode 306 and has its longitudinal axis extending substantially midway between the side edges of the electrode 306.

In the arrangement shown in FIGURES 31–33, the apparatus is generally the same as described in connection with FIGURE 25, but in this case the belt 302 cooperates in a special manner with a special supporting structure for imparting a desired movement to the material on the belt while it is in the electrostatic field. This supporting structure, illustrated in more detail in FIGURE 33, includes a series of wedge-shaped insulating bars of, for example, wood, seated in grooves in the modified electrode 306A. It is noted that every other one of the bars having the reference numeral 372 is inclined in one direction whereas the other bars having the reference numeral 373 disposed therebetween are inclined in the opposite direction. The belt 302, being engaged by these insulating bars, imparts a riffle effect to the material on the belt with the result that particles on the belt not only move along the direction of forward travel of the belt but move laterally also to a degree, thus presenting a changing surface for the particles on the belt.

Satisfactory results have been obtained using the arrangement shown in FIGURE 25 with an electrode spacing varying from 4.75″ to 4″ with a voltage of 67.5 kv. so that the gradient varies generally from 15 kv./in. to 25 kv./in. The ore used is placer sand containing euxenite and monazite as principal values, garnet, sphene, zircon, quartz and such constituting gangue. Monazite and euxenite remain on the belt. The garnet, zircon, quartz and such are lifted from the belt and expelled from the field as such material travels into the more intense field approaching a gradient of 25 kv. per inch. The particle size is the size of placer sand.

The arrangement shown in FIGURE 29 has also been used to effect separation of non-uranium bearing ores such as ores containing HgS (cinnabar) associated with talc, feldspar, shale, etc. with the electrode spacing varying from 3 to 5 inches with 65 kv. between the electrodes and with a particle size less than 35 mesh. The HgS remains inactive and is discharged from the end of the belt after the gangue has been levitated and repelled by the field.

*Description of prototype No. 4 shown in FIGURES 34–42, both inclusive*

The arrangement illustrated in FIGURES 34–40 includes an upper adjustable electrode 400 and a lower electrode 401 (FIGURES 34–39). The material to be separated is fed onto a vibrating riffle board 402 from a chute 403. Three degrees of material separation are contemplated, a first portion of the material being collected in a first modified tube 404 and collected in the container 405, a second portion of the material being collected in the pan 408 and a third portion being collected in the pan 409.

The upper electrode 400 is of sheet aluminum and is secured by suitable screws 410 to a pair of laterally extending insulating boards 412 and 413 which, as shown in FIGURE 35, have enlarged apertures so that the four supporting rods 416, 417, 418 and 419 may extend upwardly therethrough. These supporting rods are secured to the stationary framework 422. Adjustable nuts 420 are threaded on each of these supporting rods 416—419 and bear against the underside of the laterally supporting boards 412 and 413. By this means, the position of the electrode 400 may be adjusted both in elevation and inclination and, as illustrated in FIGURE 34, such electrode 400 is adjustably positioned to extend downwardly in the direction of the discharge end of the riffle board 402 so that the plane of the electrode 400 is substantially parallel with the plane of the lower electrode 401 which is mounted in the manner described presently.

The lower electrode 401 of sheet aluminum, as illustrated in FIGURE 39, is sandwiched between a pair of insulating slabs 424 and 425. The riffle board 402 is mounted on the upper slab 424, and the entire assembly, illustrated in FIGURE 39, is stationarily mounted on the supporting slab 428 which may be of plywood. This plywood supporting slab or bed 428, as shown in FIGURE 34, is pivotally mounted at opposite ends on the stationary framework 422 by means of a leaf spring 433 near the discharge end and a pair of rigid adjustable links 434 near the material entrance end. The leaf spring 433 has its lower end secured to the bracket 435 on the framework 422, while the upper end of the leaf spring 433 is connected to one part 436 of a hinge 437, the other part 438 of the hinge being secured to the bed 428. The pair of adjustable links 434, 434 (FIGURES 34 and 36) each has its lower ends hinged on a pin 437 secured to the framework 422 and its upper ends hinged to a pin 439 secured to the bed 428. Each of these links 434 is extensible. For this purpose, each link 434 comprises two straps 434A and 434B that are clamped together by a bolt and nut 440, 441. The bolt 440 passes through an enlarged aperture in the element 434B and also through the elongated adjustment slot 434C in the strap 434A. By this adjustment means, one end of the electrode 401 may be adjusted in elevation. The lower electrode 401 with, of course, the riffle board attached thereto is caused to vibrate generally in its plane, as indicated by the arrows 435 in FIGURE 34, by a driving mechanism presently described.

This driving mechanism involves the use of an unbalanced weighted structure rotatably supported on the underside of the bed 428 and driven by the motor 442 which is mounted on the base plate 444 of the stationary framework 422. The motor 442 has a pulley 445 on its output shaft and drives the flexible belt 447. This belt 447 passes over the pulley 445 and an adjustable pulley 448 and a pulley 449. The pulley 448 is adjustably mounted on the bracket 450 extending upwardly from the base plate 444, while the pulley 449 is rotatably supported in a pair of spaced bearings 452 and 453, both mounted on the underside of the bed 428. The pulley 449 is concentrically mounted on the shaft 455. This shaft 455 has an integrally mounted eccentric cylindrical portion 457. This cylindrical eccentrically disposed portion 457 in turn has adjustably positioned thereon a cylindrical weighted member 459 having an off-centered bore which is slightly larger in diameter than the diameter of the cylindrical portion 457. The cylinders 457 and 459 are adjustably secured together by a set screw 460 which is threaded in the cylindrical member 459 with its end engageable with the inner cylindrical member 457. As shown in FIGURE 38, the degree of unbalance in the rotating structure may be changed by positioning the elements 457 and 459 relative to each other. The unbalanced elements 457 and 459 rotating about the axis of the shaft 455 produce movement of the riffle board 402 in the direction indicated by the arrow 435, the degree and direction of such motion, of course, being influenced by the flexing of the leaf spring 433, and such motion being permitted by hinging the links 434, as described previously.

The riffle board 402, as shown in FIGURE 40, has a plurality of grooved portions in which the material rests. These grooved portions 402A extend generally at an angle of 45 degrees with respect to the longitudinal axis of the board, i.e. an angle of 45 degrees with respect to the direction of vibration 435, although some minerals require such grooved portions to extend at angles other than 45 degrees. As shown in FIGURE 34, these grooved portions 402A, in cross-section, are generally triangular and resemble a saw-tooth.

As indicated previously, the material which is placed on the riffle board through chute 403 is subjected to vibration as well as to the electrostatic field between the electrodes. The riffle board 402 is inclined, and hence there is a tendency for such material to gravitate. That portion of the material which is mostly sensitive to the electrostatic field is levitated out of the grooved portions 402A and ultimately gravitates into one of the trays 408 or 409, as the case may be, depending upon the relative susceptibility of those portions of the material to the action of the electrostatic field. On the other hand, that material which is not influenced appreciably by the electrostatic field remains in the grooved portions 402A and travels generally in the direction of such grooves into the collecting tube 404 from which it gravitates into the container 405. Preferably, the pitch of the riffle board is in the range of 2 degrees to 5 degrees with respect to the horizon. The amount or degree the riffle board 402 is vibrated may be controlled by changing the unbalanced weight which rotates about the axis of the shaft 455 (FIGURE 38). This degree of unbalance, as indicated previously, may be changed by shifting a tubular cylindrical portion with respect to the eccentric cam portion 457 and then locking these two elements together using the locking set screw 460.

In the modified arrangement shown in FIGURE 41, the bed 428 with, of course, the riffle board 402 attached thereto is permitted not only to move in its longitudinal direction, as described previously, but such bed is permitted to vibrate also laterally in the direction indicated by the arrows 470 in FIGURE 41. To permit such movement in the direction indicated by the arrows 470, the hinge pins 438 are sufficiently elongated, as shown, and, likewise, the hinge structure which hinges the bed plate 428 to the leaf spring 433 has an elongated pin, as exemplified by the elongated hinge pin 438A. A pair of tension springs 472 normally serve to maintain the bed plate 428 in a central position, and for this purpose one end of each spring 472 is attached to a corresponding link member 434 with the other end of each of the springs being attached to a corresponding bracket 474 and 475 mounted on such bed plate 428. In order to produce a relatively large excursion of the bed plate in the direction indicated by the arrows 470, an unbalanced weight 479 is rotated about the shaft 480, the axis of which extends in the longitudinal direction of the riffle board. This unbalanced weighted structure is also adjustable and is of the character previously described in connection with FIGURE 38. This unbalanced weighted structure is rotated by the driving pulley 482 which serves to drive the pulley 483 mounted on the shaft 480. The shaft 480 is rotatably supported on the underside of the bed plate 428.

In the arrangement shown in FIGURE 42 a modified riffle board 484 is provided and such riffle board 484 may be used in either the arrangement shown in FIGURE 34 or the arrangement shown in FIGURE 41. The riffle board 484 is characterized by the use of removable and adjustable cleats 486 defining the aforementioned channels 402A. The size of these channels 402A, as well as their angularity with respect to the longitudinal axis of the riffle board, may thus be altered by adjustably positioning the cleats 46 which may be either screwed or nailed onto the wooden base plate 485 of the riffle board 484, using screws or nails of insulating material to avoid breakdown on that account.

Satisfactory results have been obtained using the arrangement shown in FIGURE 34 with uraninite and five types of metamict minerals using a voltage in the order of 65 kv. and a spacing in the order of 3 inches. The uranium minerals are discharged by the riffles while the gangue is levitated and expelled from the field at the low end of the riffle board.

Satisfactory results have also been obtained using the arrangement shown in FIGURE 34 with a non-uranium bearing ore such as scheelite (1%) in pegmatite and also associated with placer sand. The particle size is less than 35 mesh. Scheelite is the riffle discharge and the gangue is levitated and expelled from the field.

*Description of prototype No. 5 shown in FIGURES 43 and 44*

In the arrangement shown in FIGURE 43 the material is placed in a cup 500 of insulating material which is vibrated above a spherical electrode 501 so as to cause some of the material to be levitated out of the cup 500 with such levitated material traveling in the general direction indicated by the arrows 502. The cup 500 is mounted on one end of an insulating handle 504, the other end of the handle being attached to a bar 506 which is coupled to the movable armature core 507 associated with an electromagnetic coil 508. The coil 508 is mounted on a base 510 which is spring mounted by means of mounting springs 512 and 513 on a stationary base 514.

The core 507 is attached to the base 510 by a leaf spring 512. A second leaf spring 514 connects one end of the bar 506 to the base 510. When the coil is energized with alternating current, the mounting bar 506 is moved generally in the direction indicated by the arrow 510A to pass the material in the cup 500 while it is under the influence of electrostatic field resulting from the application of voltage to the sphere 501. The sphere 501 may either have a positive potential or a negative potential, and instead of being placed below the container 500 may be placed above the container, as shown in the modified arrangement in FIGURE 44. The cup 500, in either case, need not be connected conductively to the power supply which supplies voltage to the sphere 501. It has been found that in a mineral containing dakite or schroeckingerite, the dakite or schroeckingerite is levitated, as indicated by the arrows 502, but the remaining material remains in the cup 500.

Satisfactory results have been obtained using the arrangement shown in FIGURE 43 with a 3″ diameter electrode charged at 25 kv. in the case of schroeckingerite and 50 kv. in the case of kasolite or uranophane, with such ones having a particle size of less than 35 mesh. The schroeckingerite is thrown out at voltages above 20 kv., leaving a clay gangue in the cup 500. In the case of kasolite or uranophane, the limestone goes off, leaving the uranium minerals in the cup.

*Description of prototype No. 6 shown in FIGURE 45*

The arrangement illustrated in FIGURE 45 includes a pair of adjustably supported vertical electrodes 600 and 601 mounted respectively on the framework 603 by insulating threaded rods 604 and 605.

The ore in comminuted form is blown in a generally horizontal direction in an air stream produced with conventional apparatus which incorporates nozzle means 606.

The unaffected portion of the ore follows generally a parabolic path, indicated by the dotted lines 607, gravitating between the energized electrodes 600 and 601 and being collected in a central bin or hopper 608. A second portion of the ore is levitated by the electrostatic field and follows a path, indicated generally by the dotted lines 610. The path of movement of such levitated particles is influenced by suction produced by the exhaust type of motor driven fan 612. The suction is sufficient to collect all of the particles levitated, and such levitated particles are collected, after passing through the hood 614, in a trap (not shown), associated with the fan 612. A second and third portion of such ore takes the paths indicated by the dotted lines 616 and 617, with such particles that are affected by the electrostatic field between the plate electrodes 600 and 601, impinging respectively on the electrodes 600 and 601. Those particles impinging on the electrode 600 are collected in the hopper 620; and those particles impinging on the electrode 601 are collected in the hopper 622. These particles impinging on the electrodes either gravitate downwardly along the surface of such electrodes; or, in some instances, such particles cling to the electrodes and are subsequently removed as, for example, by brushing after the electrodes are deenergized.

Satisfactory results have been obtained using the arrangement shown in FIGURE 45 with an electrode spacing of about 4 inches and a voltage of about 100 kv., and with cylindrical electrodes having a diameter of 2 inches or greater. The ore used is either molybdenite with orthoclase, quartz, etc., or the oxide of germanium associated with nickelferrous pyrrhotite. In the case of molybdenite, it is deposited on the positive electrode and removed by a wiper blade as the electrode revolves about its vertical axis and levitation of the gangue occurs. In the case of germanium oxide, it is also deposited from its associated mass under the same conditions. However, neither one of these two minerals are deposited unless a radio frequency field is superimposed on the continuous electrostatic field. All particles are less than 80 mesh.

Satisfactory results have also been obtained with columbite or tantalite with a 5″ electrode spacing and a maximum voltage, a little less than the breakdown voltage. The particle size is less than 100 mesh and the columbite or tantalite passes through while the activated components are selectively deposited or repelled vertically, i.e. levitated as indicated.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:
1. In a process for separating finely divided particles, in which a first portion of said particles, when placed in an electrical field established by a pair of oppositely charged electrodes, is substantially uninfluenced by the field and gravitates through the space between the electrodes, and in which a second portion of the particles moves in said field and during such movement travels in the direction of decreasing field intensity and oppositely in the direction of gravitational attraction, the steps comprising, maintaining a high potential electrostatic field which exerts an electrostatic stress above the critical threshold potential of the particles of said second portion to cause said second portion to move in the direction of decreasing field intensity and oppositely from the direction of gravitational attraction, introducing said finely divided particles into said field between said electrodes without the material touching the same whereby said first and second portions of said finely divided particles move in different directions toward different discharge points, and separately collecting said first and second portions.

2. In a process for separating and recovering particles of minerals from finely divided ore, the steps comprising, introducing a stream of such ore into the space between oppositely charged electrodes without the ore touching the same, creating between said electrodes an electrostatic field above the critical threshold potential of the mineral in said stream to levitate said particles out of said field in a direction of decreasing field strength and in a direction opposite to gravitational force acting on said particles of mineral, and collecting the levitated particles of mineral.

3. In a method for separating finely divided particles of a certain material from a mixture of comminuted materials which is subjected to a field created by oppositely charged electrodes, the steps comprising, discharging a stream of the mixture subject to the influence of gravity along a predetermined path between said electrodes without said materials touching the same, applying to said electrodes an electrostatic stress field above a critical threshold potential to said certain material to induce migration of said particles upwardly in a direction of decreasing field intensity of said field and out of the path of said stream.

4. In apparatus of the character described, a pair of oppositely charged electrodes, means for discharging material into the space between said electrodes without the material touching the electrodes, a voltage source connected to said pair of electrodes and having sufficient voltage intensity to produce levitation of material which would otherwise gravitate through the space between the electrodes, and material collecting means collecting the material levitated by said voltage.

5. In apparatus of the character described, a pair of oppositely charged electrodes, means for discharging material into the space between the electrodes without said material touching said electrodes, a voltage source connected between said pair of electrodes, said voltage source being sufficiently high in intensity to produce levitation of a levitated portion of material upwardly and in a direction of gravity forces acting thereon, material collecting means for collecting said levitated portion, and second material collecting means for collecting that portion of said material which gravitates between said electrodes and which is not levitated.

References Cited in the file of this patent

UNITED STATES PATENTS

| | | |
|---|---|---|
| 1,663,863 | Royster et al. | Mar. 27, 1928 |
| 1,992,974 | Thompson | Mar. 5, 1935 |
| 2,300,324 | Thompson | Oct. 27, 1942 |
| 2,306,105 | Grave | Dec. 22, 1942 |
| 2,392,044 | Horsfield | Jan. 1, 1946 |
| 2,635,749 | Cropper | Apr. 21, 1953 |
| 2,689,648 | Maestas | Sept. 21, 1954 |

FOREIGN PATENTS

| | | |
|---|---|---|
| 112,021 | Australia | Oct. 27, 1942 |

OTHER REFERENCES

Bureau of Mines, Mineral Investigations Refining Alabama Flake Graphite, December 1918.

Bureau of Mines, R I 4286, "New Dry Concentrating Equipment," May 1948, pp. 3–7.

Bureau of Mines, R I 3677, "An Electrostatic Separator for Fine Powders," December 1942, pp. 1 and 2 and FIGURES 1 and 2.